(12) United States Patent
Zimmerman et al.

(10) Patent No.: US 12,499,629 B1
(45) Date of Patent: Dec. 16, 2025

(54) EXTENDED-REALITY SYSTEMS AND METHODS FOR PRIORITIZING DISPLAY OF OBJECT AUGMENTS

(71) Applicant: Meta Platforms Technologies, LLC, Menlo Park, CA (US)

(72) Inventors: Jared Zimmerman, San Francisco, CA (US); Claire Delelys Wolf, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 118 days.

(21) Appl. No.: 18/069,932

(22) Filed: Dec. 21, 2022

(51) Int. Cl.
*G06T 19/00* (2011.01)
*H04L 67/131* (2022.01)

(52) U.S. Cl.
CPC .......... *G06T 19/006* (2013.01); *H04L 67/131* (2022.05)

(58) Field of Classification Search
CPC ............................ G06T 19/006; H04L 67/131
See application file for complete search history.

(56) References Cited

U.S. PATENT DOCUMENTS

| | | | |
|---|---|---|---|
| 2016/0171771 A1* | 6/2016 | Pedrotti | G06F 3/002 345/633 |
| 2016/0373814 A1* | 12/2016 | Kellner | G06V 20/40 |
| 2017/0031575 A1* | 2/2017 | Dotan-Cohen | G06F 3/038 |
| 2021/0090343 A1* | 3/2021 | Godi | G06F 3/011 |
| 2022/0103974 A1* | 3/2022 | De Jong | G06F 3/04886 |

* cited by examiner

*Primary Examiner* — Yi Yang
(74) *Attorney, Agent, or Firm* — Morgan, Lewis & Bockius LLP

(57) ABSTRACT

A computer-implemented method that includes (1) maintaining access to a database that contains object augments mapped to one or more objects along with which the object augments are configured to be presented to and sensed by a user via an extended-reality system, (2) detecting an object in the user's environment that is mapped to at least one object augment in the database, (3) determining whether a presentation condition associated with the at least one object augment is satisfied, (4) prioritizing presentation of the at least one object augment to the user via the extended-reality system when the presentation condition is satisfied, and (5) constraining presentation of the at least one object augment to the user via the extended-reality system when the presentation condition is not satisfied. Various other methods, systems, and computer-readable media are also disclosed.

20 Claims, 33 Drawing Sheets

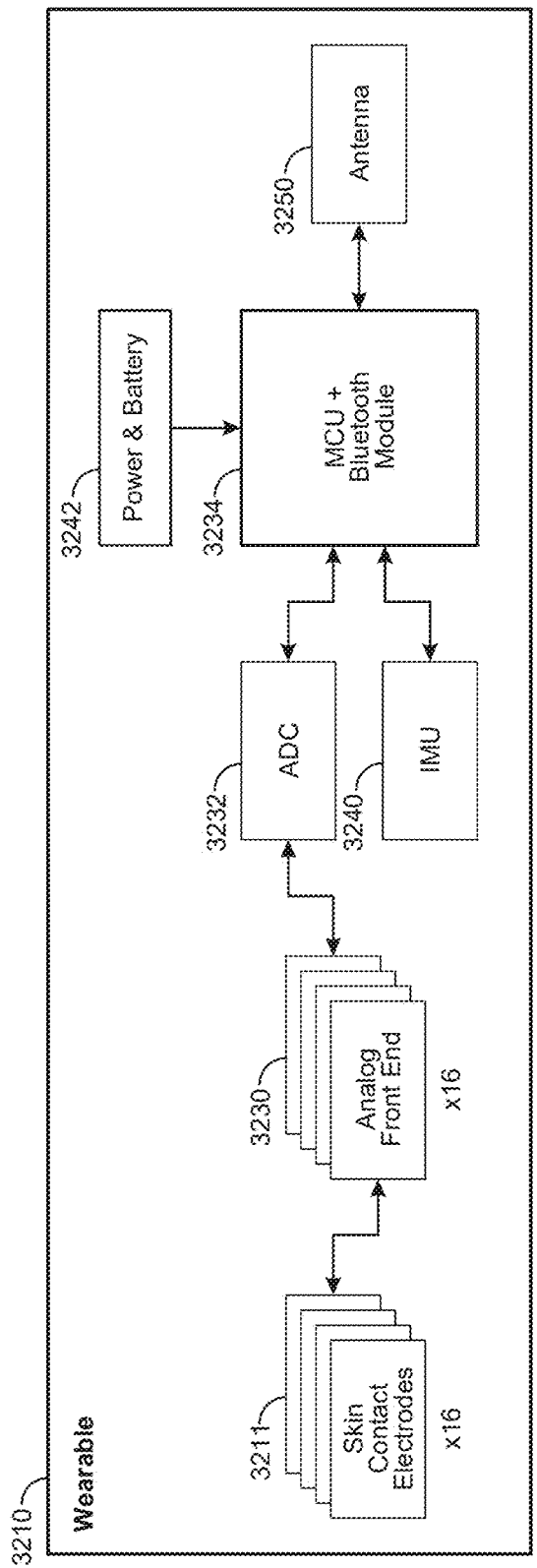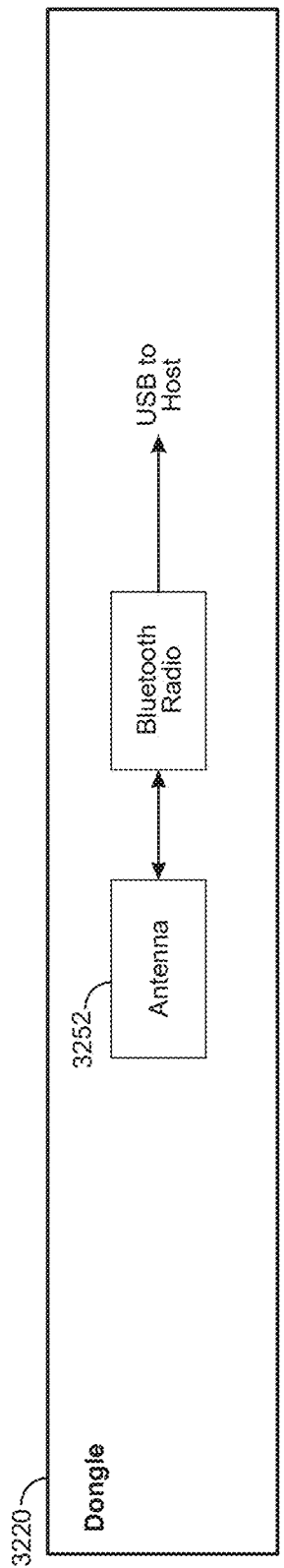
FIG. 32A
FIG. 32B

EXTENDED-REALITY SYSTEMS AND METHODS FOR PRIORITIZING DISPLAY OF OBJECT AUGMENTS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 32A and 32B are illustrations of an exemplary schematic diagram with internal components of a wearable system.

Figure 1:
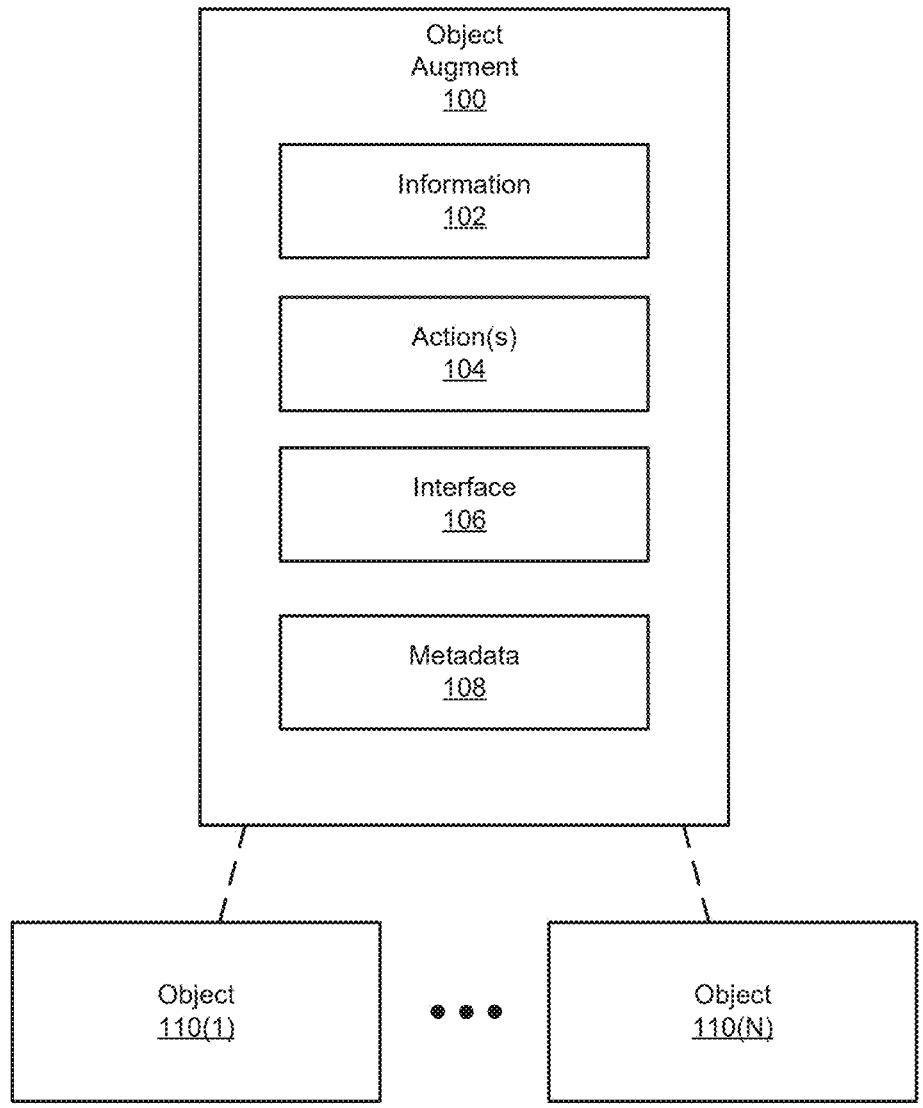
FIG. 1 is a block diagram of an exemplary object augment according to at least one embodiment of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Augmented-Reality (AR) systems, Virtual-Reality (VR) systems, and Mixed-Reality (MR) systems, collectively referred to as Extended-Reality (XR) systems, are a budding segment of today's personal computing systems. XR systems, especially wearable XR systems such as AR glasses, may be poised to usher in an entirely new era of personal computing by providing users with persistent "always-on" assistance, which may be integrated seamlessly into the users' day-to-day lives. In contrast to more traditional personal computing devices, such as laptops or smartphones, XR devices may include displays that are always in users' fields of view and always available to present content (e.g., as visual overlays) to the users. Conventional XR devices typically avoid being distracting and/or overwhelming to users by limiting the amounts and types of content provided to their users.

The present disclosure is generally directed to XR systems that supplement users' experiences of objects (e.g., real-world objects) by presenting associated object augments along with, or otherwise attached to, the objects, as described in greater detail below. Examples of object augments that the disclosed XR systems may attach to objects may include, without limitation, (1) information about or attached to the objects, (2) actions that may be performed by the objects, (3) actions that may be performed by the user in connection with the objects, and/or (4) interface elements that may present such information and/or enable initiation of such actions. In some embodiments, the disclosed XR systems may enable users or other entities to create and/or contribute object augments to the disclosed XR systems and/or attach object augments to objects in their environments, which may result in an almost endless supply of object augments that may be presented by the disclosed XR systems. As the disclosed XR systems become more prevalent and the number of object augments available to them increases, the disclosed XR systems may increasingly encounter situations in which presentation of all available object augments may distract, annoy, and/or overwhelm users. For example, the disclosed systems may encounter environments that contain many augmentable objects or objects to which many object augments have been mapped.

As will be explained in greater detail below, embodiments of the present disclosure may prioritize the presentation (e.g., visibility or visual prominence) of object augments, especially in augment-rich environments. For example, when a user encounters an object that has been mapped to many object augments, embodiments of the present disclosure may determine which of the object augments should be presented to the user and which of the object augments should not be presented to the user. Similarly, when a user encounters an environment with many augmentable objects, embodiments of the present disclosure may determine which of the objects should or should not be augmented for the user. The disclosed systems and methods may prioritize presentation of object augments to users based on a variety of factors such as explicit and/or implicit user preferences, past user interactions, habits, or behaviors, contextual clues, safety concerns, access rights, user familiarity, user relevance (e.g., relevance to a particular user state or role), user importance, user states, and/or user roles. By prioritizing presentation of object augments, the disclosed systems and methods may adapt to users wants and needs without overwhelming or burdening the users with excessive, irrelevant, and/or unwanted distractions.

The disclosed XR systems may be beneficial to a variety of users in a variety of contexts, as will be highlighted throughout the present disclosure. In the exemplary context of hiking, the disclosed XR systems may present educational object augments next to plants and animals to assist interested hikers with identifying and learning about the plants and/or animals they encounter. If a hiker encounters a plant or animal that is toxic, poisonous, or venomous, the disclosed systems may position a safety object augment next to the plant or animal such that the user can quickly and easily identify the threat and avoid any danger presented by the plant or animal. For hikers that have indicated either explicitly or implicitly that they are uninterested in identifying or learning about plants and animals and/or otherwise wanting to "disconnect," the disclosed XR systems may refrain from presenting educational object augments but may still present safety object augments when necessary to ensure the hikers' safety. For example, even if a hiker has disabled presentation of object augments, the disclosed XR systems may place a just-in-time danger marker over a poisonous or toxic plant after detecting that the hiker is very close to a known location of the plant and after visually confirming that the plant is still present at that location. In the context of hiking, the disclosed XR systems may present hikers with various additional object augments such as overlayed trail paths or markers to assist with navigation, fitness overlays to encourage fitness goals, social or secret messages left by friends or other hikers, commentary provided by park rangers, to name just a few. For users not engaged in hiking, the disclosed XR systems may present other types or forms of object augments. For example, if a user is a park ranger, the disclosed XR systems may present object augments along with plants and/or animals that are more suitable for performing park operations or maintenance tasks (e.g., object augments with dialog for presentation to visitors or object augments containing identification numbers or health statistics for managing park animals).

In the exemplary context of a road trip, the disclosed XR systems may show educational object augments or pedestrian-navigation object augments to a driver visiting a historic site as the driver explores the site by foot. When the driver returns to their car and begins manually driving, the disclosed XR systems may stop presenting navigational object augments intended for pedestrians but may begin presenting navigational object augments related to driving such as a visual overlay showing a predetermined route superimposed on a roadway or a persistent legal speed indicator. As the driver enables level-5 autonomous driving, the disclosed XR systems may fade out driving-related object augments and fade in object augments related to points of interest along the route. The disclosed XR systems may display object augments associated with points of interest in the distance reduced in visual prominence. For example, the disclosed XR systems may present simple text-based object augments for distant land features, like bridges and mountains. For points of interest that are closer, the disclosed XR systems may display more complex object augments with additional features such as readable histories and/or interfaces for adding the points of interest as stops on future road trips. For the drivers companions, the disclosed XR systems may present other types or forms of object augments. For example, the disclosed XR systems may present object augments to the driver's minor children that are more suitable for the children's educational levels and/or interests.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 7:
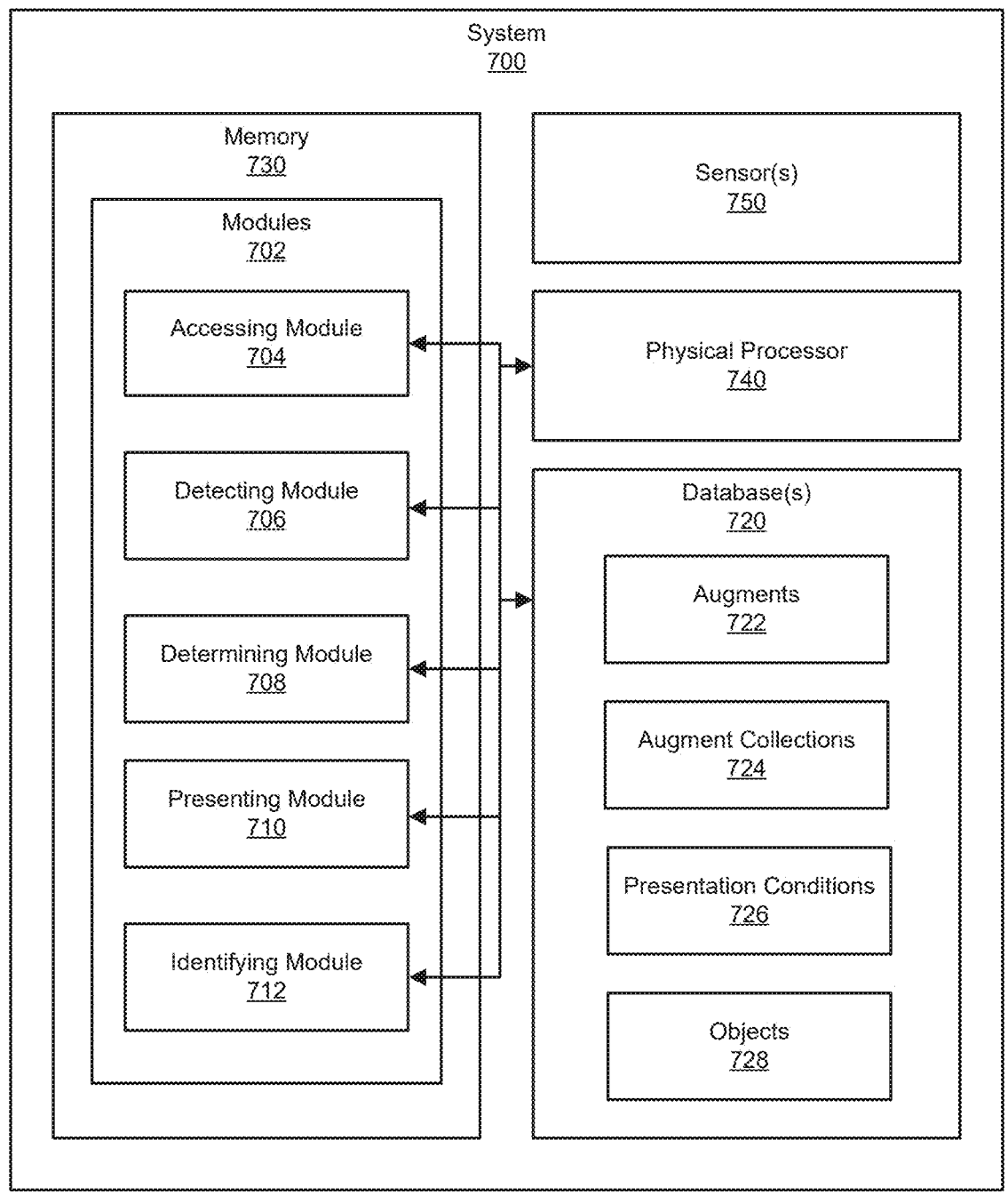
FIG. 7 is a block diagram of an exemplary system for prioritizing display of object augments according to at least one embodiment of the present disclosure.
Figure 8:
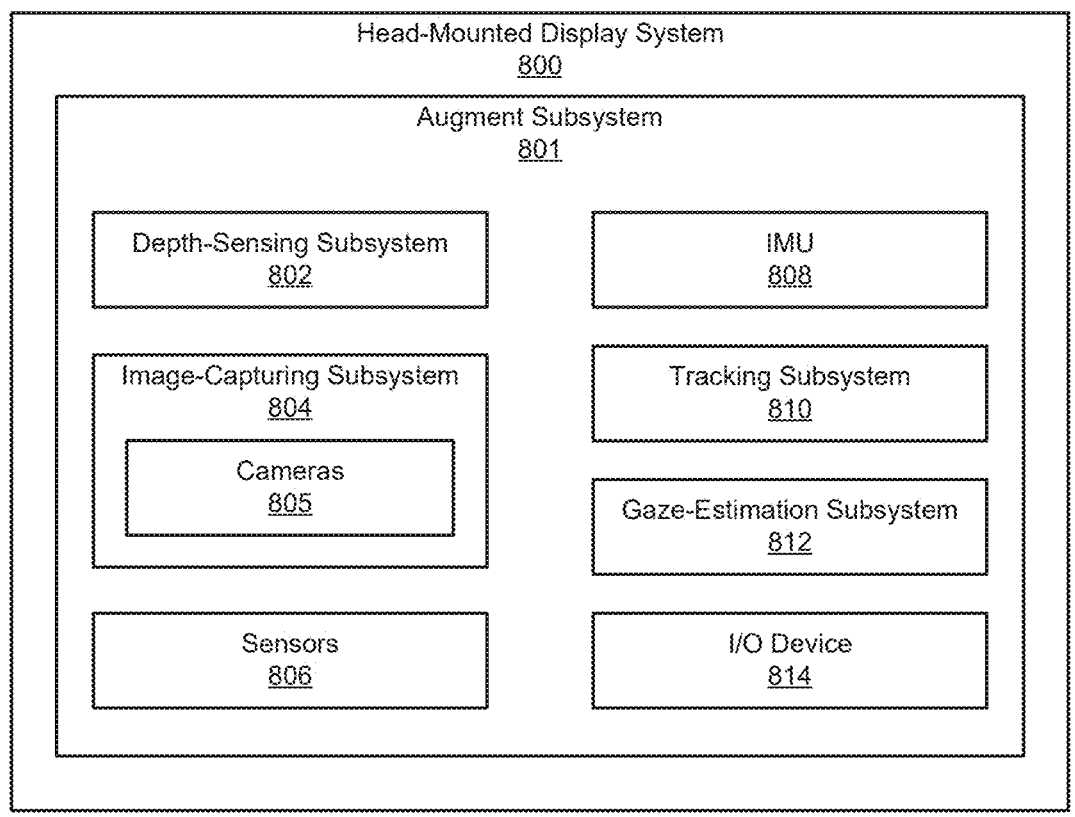
FIG. 8 is a block diagram of an exemplary head-mounted display system for prioritizing display of object augments according to at least one embodiment of the present disclosure.
Figure 9:
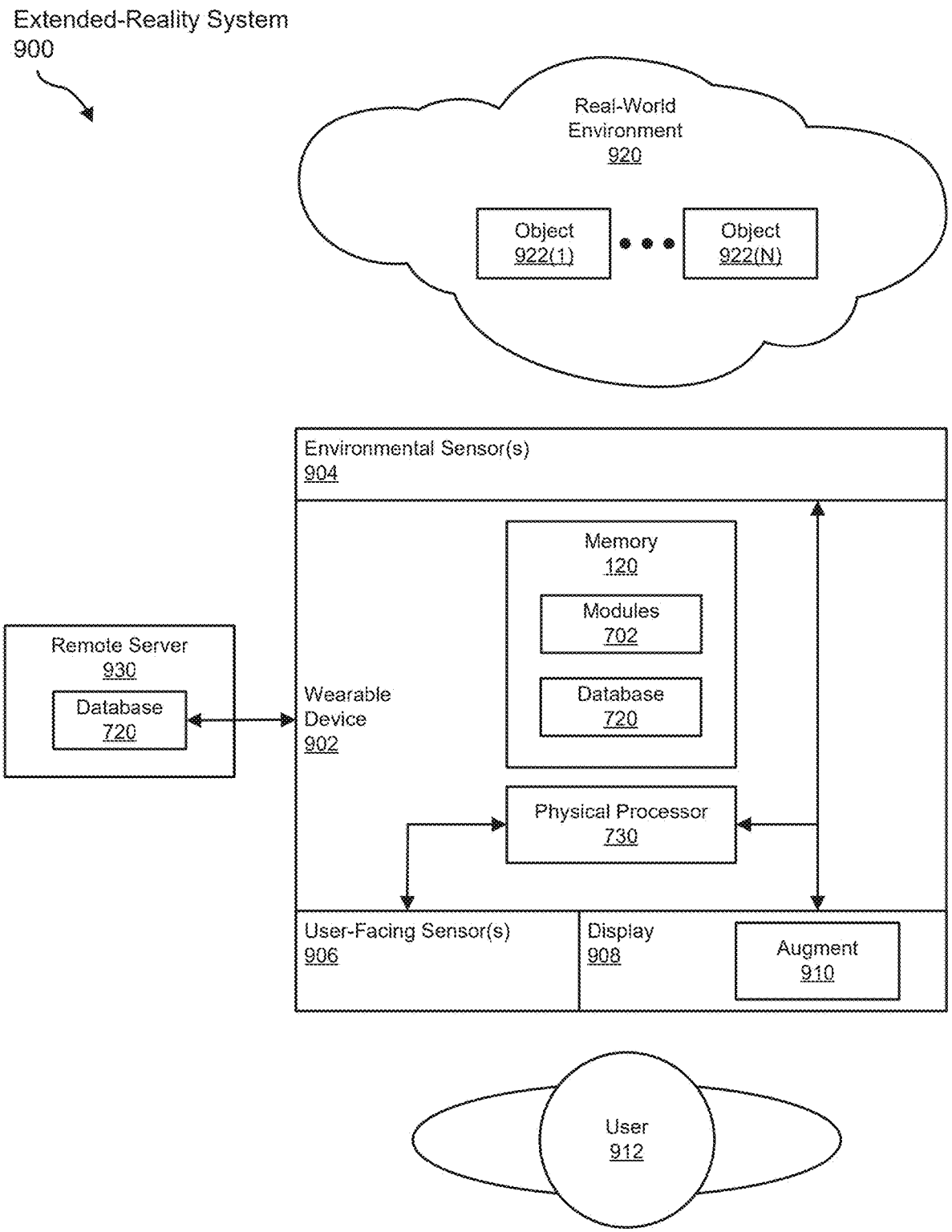
FIG. 9 is a block diagram of an exemplary extended-reality system for prioritizing display of object augments according to at least one embodiment of the present disclosure.

The following will provide, with reference to FIGS. 1-6 and 33, detailed descriptions of exemplary object augments. With reference to FIGS. 7-9, the following will provide detailed descriptions of exemplary systems and subsystems for prioritizing display of object augments. The discussions corresponding to FIGS. 10-23 will provide detailed descriptions of corresponding methods. Finally, with reference to FIGS. 24-32, the following will provide detailed descriptions of various extended-reality systems and components that may implement embodiments of the present disclosure.

FIG. 1 is a block diagram of an exemplary object augment 100 that has been mapped to one or more objects 110. In some embodiments, objects 110 may represent or include anything material in a user's environment that may be sensed and/or distinguished by a user. In some embodiments, objects 110 may represent or include animate and/or inanimate real-world objects. Examples of real-world objects that may be mapped to object augment 100 include, without limitation, people, animals, plants, buildings, structures, walls, surfaces, materials, land, locations, elements, geological formations, monuments, media, videos, sounds, tastes, smells, music, texts, signs, photographs, paintings, attractions, exhibits, foods, goods, furniture, cars, clothes, toys, tools, instruments, equipment, devices, appliances, parks, paths, roads, and/or components, variations, or combinations of one or more of the same. In some embodiments, objects 110 may represent virtual objects. In some examples, objects 110 may represent specific objects (e.g., specific locations, people, or books). In other examples, objects 110 may represent a specific type of object (e.g., people who have taken on a certain role such as policemen or books that are part of a particular genre).

As will be explained in greater detail below, the disclosed systems may present object augment 100 to users along with objects 110 when objects 110 are encountered in the users' real-world or virtual environments if certain presentation conditions are satisfied. In some embodiments, object augment 100 may represent or include any type or form of content that may be presented to, sensed by, and/or interacted with by a user using an XR device such as visual content, auditory content, somatosensory content, olfactory content, and/or gustatory content. In some embodiments, object augment 100 may represent or include any type or form of computer-readable instructions that may be used to generate or access content that may be presented to, sensed by, and/or interacted with by a user using an XR device.

As shown in FIG. 1, object augment 100 may include information 102 associated with objects 110, one or more actions 104 associated with objects 110, one or more interfaces 106 enabling access to and/or interaction with information 102 and/or actions 104, and/or metadata 108. In some embodiments, information 102 may represent or include information about objects 110 that may be presented to users when the users encounter objects 110 such as descriptions, histories, attributes, statistics, backgrounds, excerpts, makeups, instructions, schematics, ratings, reviews, warnings, translations, transformations, alternatives, substitutes, and/or origins. In some embodiments, information 102 may represent or include computer-readable instructions that may be used to generate or access information about the objects. Additionally or alternatively, information 102 may represent or include information that has been attached to and/or otherwise associated with an object (e.g., by a user of the disclosed systems). For example, information 102 may represent a message or media attached to an object by a user for later retrieval or discovery by a friend or social connection.

In some embodiments, actions 104 may represent and/or include actions, functions, intents, activities, or services that objects 110 are capable of performing. In other embodiments, actions 104 may represent or include actions, functions, intents, activities, or services that may be performed on objects 110 by users via the disclosed systems. Additionally or alternatively, actions 104 may represent or include actions, functions, intents, activities, or services that may be performed on or by object augment 100. In some embodiments, actions 104 may include instructions or machine-readable code for performing and/or triggering some or portion of an action.

In some embodiments, object augment 100 may include metadata 108 that describes attributes of object augment 100 and/or objects 110. As will be explained in greater detail below, the disclosed systems may use these attributes to detect objects 110 and/or determine whether object augment 100 should or should not be presented to a user. Examples of attributes that may be stored as metadata 108 include, without limitation, identifiers of objects 110 (e.g., a geolocation, a real-world location, and/or an object-identifying function), priority levels, relevance levels, ratings, scores, informational qualities, entertainment qualities, indicators of localization, indicators of popularity, indicators of recentness, hazard levels, indicators of criticalness, familiarity levels, distances, sizes, indicators of complexity, indicators of distractibility, indicators of accessibility, indicators of informativeness, ages, indicators of reading levels, indicators of educational levels, access rights, contributor identifiers, and/or any other attribute of object augment 100 and/or objects 110 such as the attributes described above in connection with information 102. In some embodiments, some or all of metadata 108 may be stored as natural-language descriptions and/or machine-readable data. As will be explained in greater detail below, the disclosed systems and methods may prioritize presentation of object augment 210 to users based on the differences between their attributes and/or users' preferences, which may be based on attributes of object augments and/or objects.

In some embodiments, object augment 100 may represent an augment that has been mapped to a single object and/or may contain information, actions, interfaces, and/or metadata that are unique to the object. In other examples, object augment 100 may represent an augment that has been mapped to a class of objects and/or may contain information, actions, interfaces, and/or metadata that are unique to the class of objects. Additionally or alternatively, object augment 100 may represent an augment that has been customized and/or configured for a single user and/or a single group of users and may contain information, actions, interfaces, and/or metadata that are unique to the user and/or the group of users.

Figure 2:
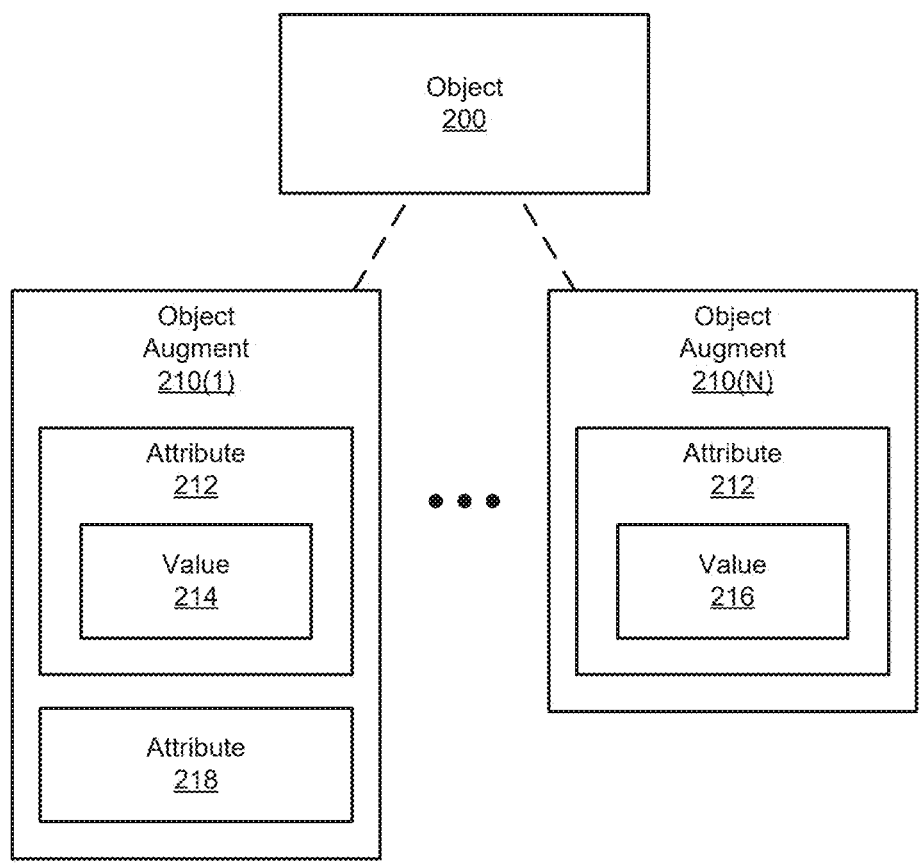
FIG. 2 is a block diagram of an exemplary object that is mapped to multiple different object augments according to at least one embodiment of the present disclosure.

In some situations, a single object or a single object class may be associated with many object augments. In such situations, the disclosed systems may prioritize display of one of the object augments over others, as described in greater detail below. FIG. 2 is a block diagram of an example object 200 that is associated with multiple object augments 210 that may be presented to users along with object 200. As shown, object augments 210 may each have one or more attributes 212 (e.g., information, actions, metadata, etc.). In this example, object augments 210 may have at least one attribute in common (e.g., attribute 212) with differing values (e.g., value 214 may differ from value 216), and object augment 210(1) may have at least one attribute 218 that object augment 210(N) does not have. As will be explained in greater detail below, the disclosed systems and methods may prioritize presentation of object augment 210 to users based on the differences between their attributes.

Figure 3:
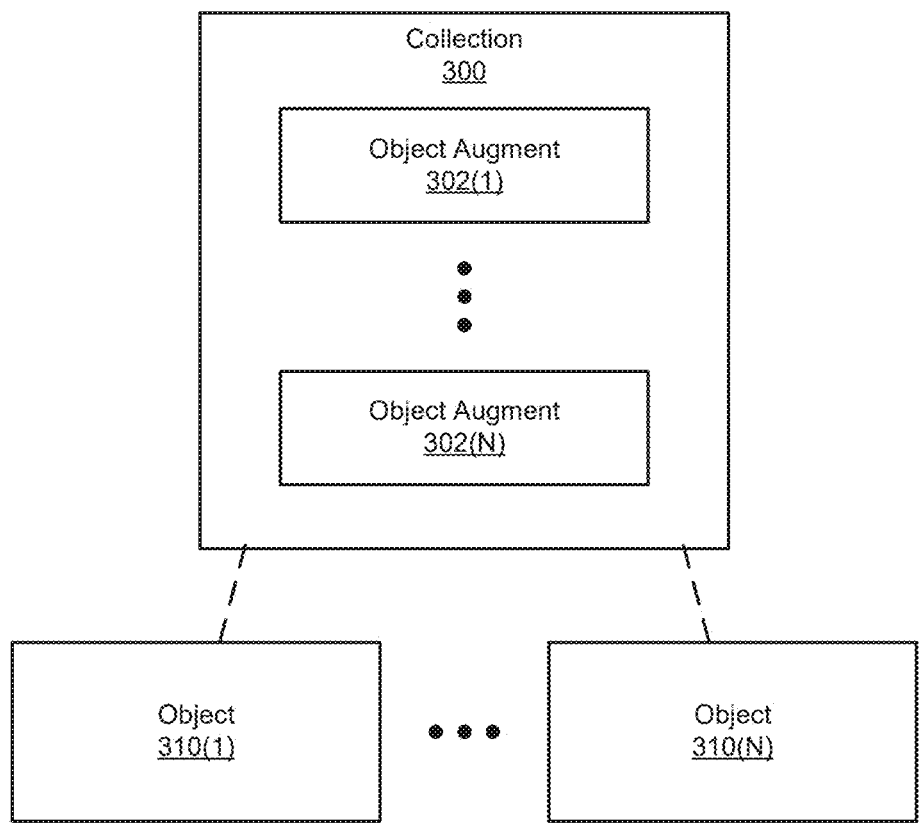
FIG. 3 is a block diagram of an exemplary collection of augments according to at least one embodiment of the present disclosure.

In some embodiments, the disclosed systems may enable related object augments to be compiled and/or to be made accessible as collections. For example, the disclosed systems may enable a creator of educational material to compile educational object augments that are intended for users interested in certain subjects and/or for users with certain education levels. In another example, the disclosed systems may enable a company to compile object augments associated with their products and/or venues. In some embodiments, the disclosed systems may automatically identify collections of related object augments based on prior user interactions with the related object augments. For example, the disclosed systems may identify a collection of object augments that are often preferred by a particular group of users and/or may present object augments from the collection to other similar users. FIG. 3 is a block diagram of an exemplary collection 300 of object augments 302(1)-(N). In some examples, the disclosed systems may map object augments 302(1)-(N) to objects 310(1)-(N), respectively. In other examples, the disclosed systems may map each of object augments 302(1)-(N) to each of objects 310(1)-(N).

Figure 33:
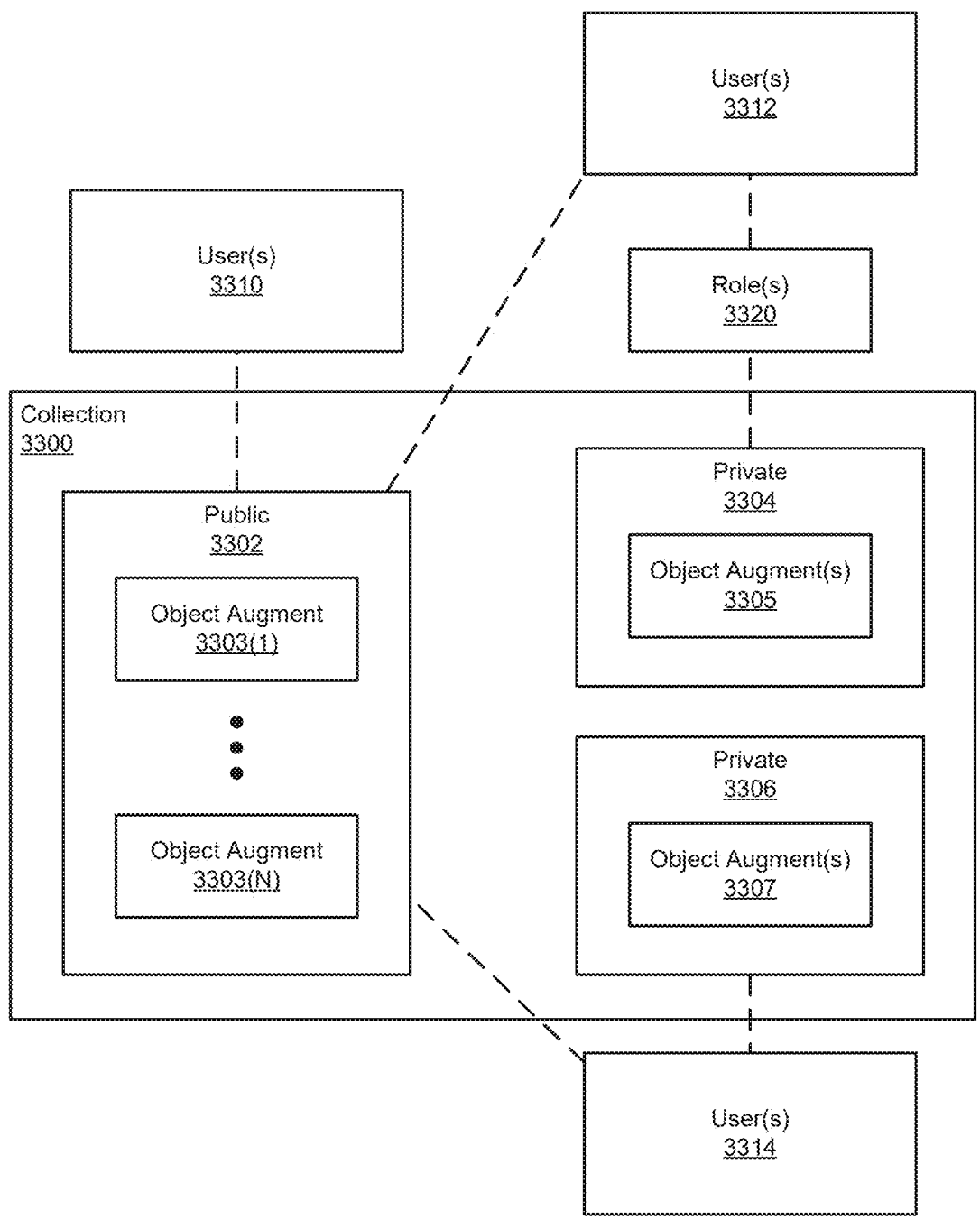
FIG. 33 is a block diagram of an exemplary collection of public and private augments according to at least one embodiment of the present disclosure.

The disclosed systems may limit access to some or all of the augments in a collection. For example, the disclosed systems may make some or all of a collection of augments publicly and/or privately accessible. In some embodiments, the disclosed systems may provide access to privately accessible augments to certain users and/or groups of users. Additionally or alternatively, the disclosed systems may provide access to privately accessible augments to users based on the users' roles. For example, an organization that maintains a wilderness park may curate a large collection of augments that may be presented to various groups of users (e.g., visitors, employees, or public-service providers) when they are at the wilderness park. The disclosed systems may enable the organization to provide public access to a portion of the collection but limit other portions to certain users or groups of users. For example, the disclosed systems may enable the organization to limit access to a portion of augments to only employees and/or employees having specific roles (e.g., park rangers or security guards). FIG. 33 is a block diagram of an exemplary collection 3300 of augments having a public collection 3302 of one or more object augments 3303, a private collection 3304 of one or more object augments 3305, and a private collection 3306 of one or more object augments 3307. In this example, the disclosed systems may provide access to public collection 3302 to users 3310, users 3312, and users 3314 but may limit access to private collection 3304 and/or private collection 3306. For example, the disclosed systems may limit access to private collection 3304 to only users 3312 (i.e., users having one of roles 3320) and/or may limit access to private collection 3306 to only users 3314 regardless of the roles of users 3314.

In some embodiments, an object augment may have a single presentational state. In other embodiments, an object augment may have multiple presentational states that may be independently presented to users. When an object augment has multiple presentational states, the disclosed systems may prioritize display of one or more of the presentation states over the others. In some embodiments, an object augment may have different presentation states that are intended for different users. In other embodiments, an object augment may have different presentation states that are intended for the same user.

Figure 4:
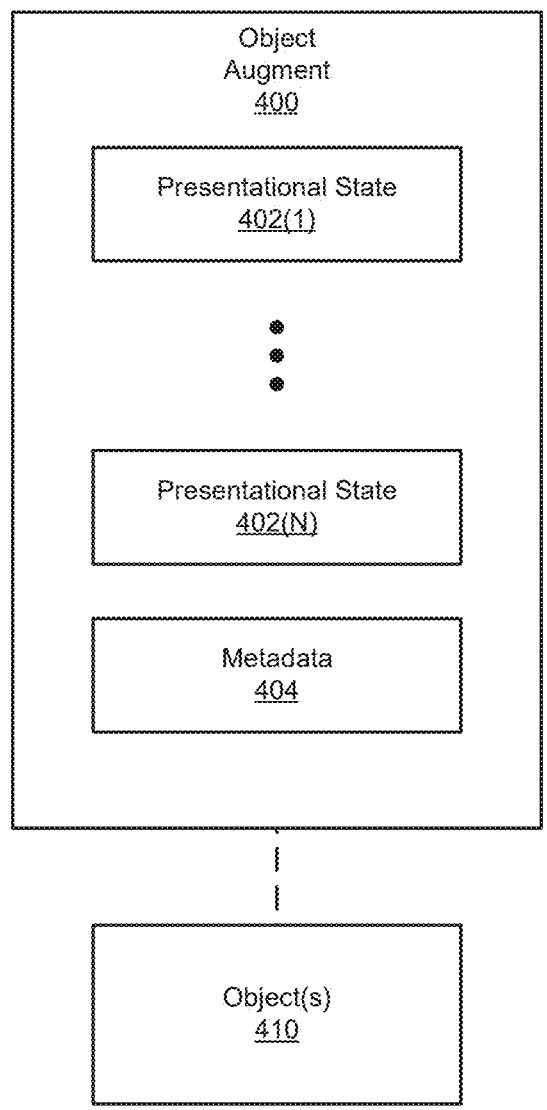
FIG. 4 is a block diagram of an exemplary object augment having multiple different presentational states according to at least one embodiment of the present disclosure.
Figure 5:
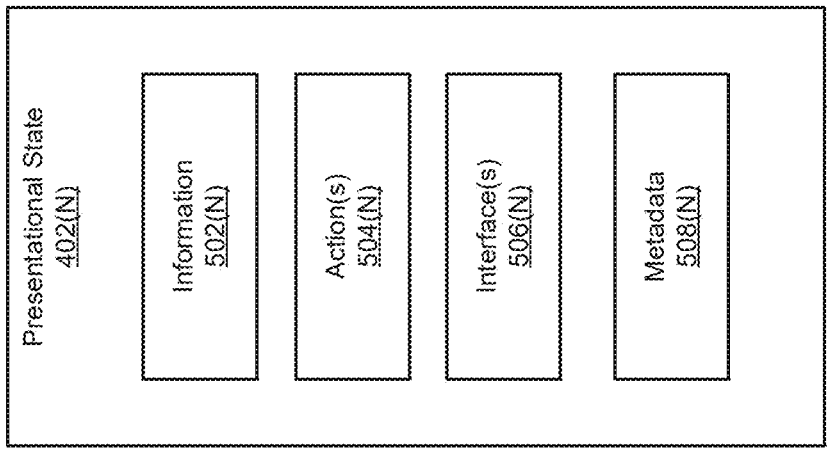
FIG. 5 is a block diagram of exemplary presentational states of an object augment according to at least one embodiment of the present disclosure.
Figure 5:
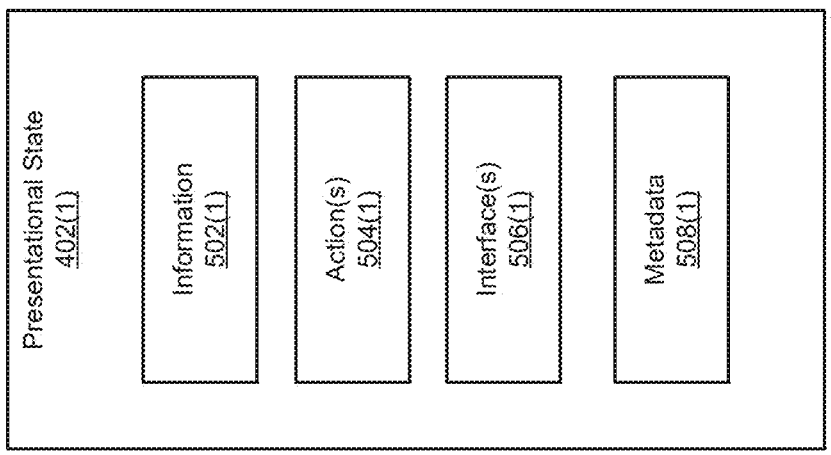

FIG. 4 is a block diagram of an exemplary object augment 400 that has multiple different presentational states 402(1)-(N) that may be individually presented to users as being attached to one or more objects 410. In some embodiments, each of presentational states 402 may include information about objects 410, one or more actions that may be performed by, on, and/or in connection with objects 410, one or more interfaces that may be used to access or interact with the information and actions, and/or metadata associated with the presentational state, object augment 400, and/or objects 410. For example, as shown in FIG. 5, presentational states 402 may include information 502, actions 504, interface 506, and metadata 508. In some embodiments, Information 502, actions 504, interface 506, and metadata 508 may be similar to information 102, actions 104, interface 106, and/or metadata 108, respectively. In some examples, information 502(1)-(N) may have some or no information in common, actions 504(1)-(N) may have some or no actions in common, interfaces 506(1)-(N) may have some or no interface elements in common, and/or metadata 508(1)-(N) may have some or no metadata in common.

Figure 6:
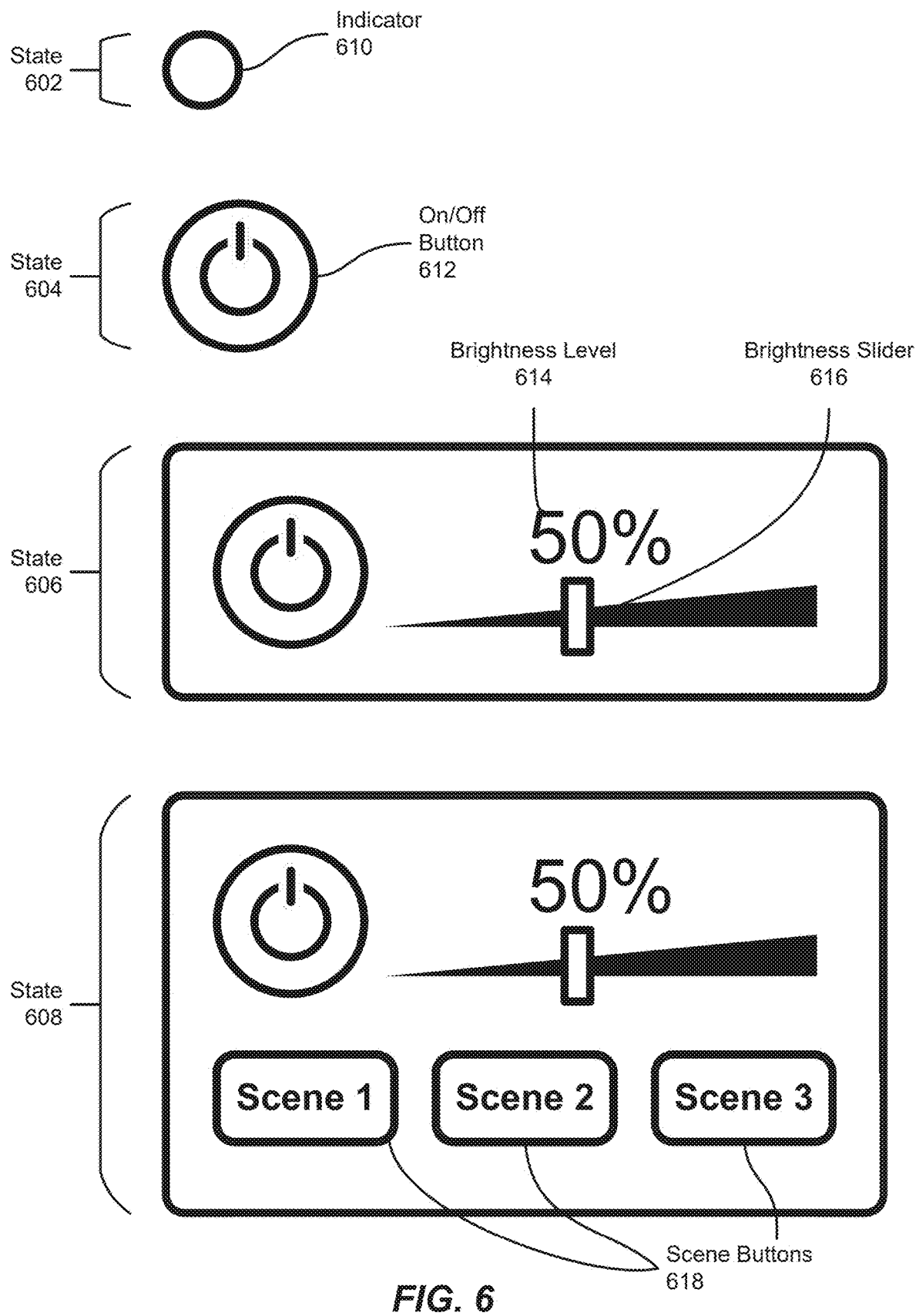
FIG. 6 is an illustration of exemplary presentational states of an object augment associated with a lighting device according to at least one embodiment of the present disclosure.

FIG. 6 is a diagram of exemplary presentational states 602-608 of an object augment associated with a lighting device. In this example, presentational state 602 may include a simple indicator icon 610 that may be attached to the lighting device to indicate the availability of additional presentational states. As shown, presentational state 604 may include a single on/off button 612 with which a user may turn on or off the lighting device. Presentational state 606 may include on/off button 612, a brightness level 614, and a brightness slider 616. Presentational state 608 may include on/off button 612, brightness level 614, brightness slider 616, and scene buttons 618 with which a user may select a predetermined scene associated with the lighting device.

FIG. 7 is a block diagram of an example system 700 for prioritizing display of object augments. As illustrated in this figure, example system 700 may include one or more modules 702 for performing one or more tasks. As will be explained in greater detail below, modules 702 may include an accessing module 704 that maintains access to a database of object augments. Example system 700 may also include a detecting module 706 that detects objects in the environments of users of system 700. Example system 700 may further include a determining module 708 that determines whether presentation conditions associated with the object augments are satisfied when opportunities to display the object augments to users of system 700 arise. Example system 700 may additionally include a presenting module 710 that prioritizes or constrains presentation of object augments to users of system 700 depending on whether their associated presentation conditions are or are not satisfied. In some examples, system 700 may also include an identifying module 712 that identifies preferences (e.g., positive or negative preferences) of users of system 700 for object augments and/or records such preferences as part of associated presentation conditions.

As illustrated in FIG. 7, example system 700 may include one or more databases such as database 720. As shown, database 720 may include object augments 722 for storing information about one or more object augments that may be presented to users of system 700, augment collections 724 for storing information about related object augments, presentation conditions 726 for storing information about the conditions under which object augments should or should not be presented to users of system 700, and/or objects 728 for storing information about objects in the environments of users of system 700 and/or their associations with object augments 722. The information represented by object augments 722, augment collections 724, presentation conditions 726, and/or objects 728 may be stored to database 720 in any suitable manner using any number of suitable data structures. Database 720 may represent portions of a single database or computing device or a plurality of databases or computing devices. For example, database 720 may represent a portion of XR device 902 and/or or remote server 930 in FIG. 9.

As further illustrated in FIG. 7, example system 700 may also include one or more memory devices, such as memory 730. Memory 730 may include or represent any type or form of volatile or non-volatile storage device or medium capable of storing data and/or computer-readable instructions. In one example, memory 730 may store, load, and/or maintain one or more of modules 702. Examples of memory 730 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 7, example system 700 may also include one or more physical processors, such as physical processor 740. Physical processor 740 may include or represent any type or form of hardware-implemented processing unit capable of interpreting and/or executing computer-readable instructions. In one example, physical processor 740 may access and/or modify one or more of modules 702 stored in memory 730. Additionally or alternatively, physical processor 740 may execute one or more of modules 702 to facilitate prioritized display of object augments. Examples of physical processor 740 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As further illustrated in FIG. 7, example system 700 may include one or more sensors 750 (e.g., biosensors and/or environmental sensors) for acquiring information about users of example system 700 and/or their environments. In some embodiments, example system 700 may use sensors 750 to detect objects in the environments of the users of system 700 and/or contextual information related to the objects, associated object augments, and the users' interactions with the objects and augments. In some embodiments, sensors 750 may represent or include one or more physiological sensors capable of generating real-time biosignals indicative of one or more physiological characteristics of users and/or for making real-time measurements of biopotential signals generated by users. A physiological sensor may represent or include any sensor that detects or measures a physiological characteristic or aspect of a user (e.g., gaze, heart rate, respiration, perspiration, skin temperature, body position, mood, and so on). In some embodiments, sensors 750 may collect, receive, and/or identify biosensor data that indicates, either directly or indirectly, physiological information that may be associated with and/or help identify users' intentions to interact with objects in the users environments. In some examples, sensors 750 may represent or include one or more human-facing sensors capable of measuring physiological characteristics of users. Examples of sensors 750 include, without limitation, eye-tracking sensors, hand-tracking sensors, body-tracking sensors, heart-rate sensors, cardiac sensors, neuromuscular sensors, electrooculography (EOG) sensors, electromyography (EMG) sensors, electroencephalography (EEG) sensors, electrocardiography (ECG) sensors, microphones, visible light cameras, infrared cameras, ambient light sensors (ALSs), inertial measurement units (IMUs), heat flux sensors, temperature sensors configured to measure skin temperature, humidity sensors, bio-chemical sensors, touch sensors, proximity sensors, biometric sensors, saturated-oxygen sensors, biopotential sensors, bioimpedance sensors, pedometer sensors, optical sensors, sweat sensors, variations or combinations of one or more of the same, or any other type or form of biosignal-sensing device or system.

In some embodiments, sensors may represent or include one or more sensing devices capable of generating real-time signals indicative of one or more characteristics of users' environments. In some embodiments, sensors 750 may collect, receive, and/or identify data that indicates, either directly or indirectly, objects within a user's environment with which a user may interact. Examples of sensors 750 include, without limitation, cameras, microphones, Simultaneous Localization and Mapping (SLAM) sensors, Radio-Frequency Identification (RFID) sensors, variations or combinations of one or more of the same, or any other type or form of environment-sensing or object-sensing device or system.

System 700 in FIG. 7 may be implemented in a variety of ways. For example, all or a portion of system 700 may represent portions of head-mounted display system 800 in FIG. 8 and/or portions of XR system 900 in FIG. 9. FIG. 8 illustrates an exemplary configuration of an augment subsystem 801 of head-mounted display system 800. Augment subsystem 801 may detect augmentable objects in a user's environment and/or may control which augments are presented to the user and when. In some examples, augment subsystem 801 may include a depth-sensing subsystem 802 (or depth camera system), an image-capturing subsystem 804, one or more additional sensors 806 (e.g., global-positioning sensors, audio sensors, etc.), and/or an inertial measurement unit (IMU) 808. One or more of these components may provide a tracking subsystem 810 with information that can be used to identify and track objects in a user's real-world environment and/or determine the position of head-mounted display system 800 relative to the real-world environment such that augments presented to a user will appear attached to the objects. Other embodiments of augment subsystem 801 may also include a gaze-estimation subsystem 812 configured to track a user's eyes relative to a display of head-mounted display system 800, objects in the real-world environment, and/or visual augments presented to the user. Augment subsystem 801 may also include an I/O device 814 for receiving input from a user and/or presenting augments to the user. Some embodiments of augment subsystem 801 may have different components than those described in conjunction with FIG. 8.

In some examples, depth-sensing subsystem 802 may capture data describing depth information characterizing a real-world environment surrounding some or all of head-mounted display system 800. In some embodiments, depth-sensing subsystem 802 may characterize a position or velocity of head-mounted display system 800 and/or objects within the real-world environment. Depth-sensing subsystem 802 may compute a depth map using collected data (e.g., based on a captured light according to one or more computer-vision schemes or algorithms, by processing a portion of a structured light pattern, by time-of-flight (ToF) imaging, simultaneous localization and mapping (SLAM), etc.). In some examples, the depth maps may be used to generate a model of the real-world environment surrounding head-mounted display system 800. Accordingly, depth-sensing subsystem 802 may be referred to as a localization and modeling subsystem or may be a part of such a subsystem.

In some examples, image-capturing subsystem 804 may include one or more optical image sensors or cameras 805 that capture and collect image data from a user's real-world environment. In some embodiments, cameras 805 may provide stereoscopic views of a user's real-world environment that may be used by tracking subsystem 810 to identify and track objects. In some embodiments, the image data may be processed by tracking subsystem 810 or another component of image-capturing subsystem 804 to generate a three-dimensional model of the user's real-world environment and the objects contained therein. In some examples, image-capturing subsystem 804 may include simultaneous localization and mapping (SLAM) cameras or other cameras that include a wide-angle lens system that captures a wider field-of-view than may be captured by the eyes of the user. In some embodiments, augment subsystem 801 may use a model of a user's real-world environment to detect augmentable objects in the real-world environment. Additionally or alternatively, augment subsystem 801 may use the model of the real-world environment to attach augments to objects in the real-world environment.

In some examples, IMU 808 may generate data indicating a position and/or orientation of head-mounted display system 800 based on measurement signals received from one or more of sensors 806 and from depth information received from depth-sensing subsystem 802 and/or image-capturing subsystem 804. For example, sensors 806 may generate one or more measurement signals in response to motion of head-mounted display system 800. Examples of sensors 806 include one or more accelerometers, one or more gyroscopes, one or more magnetometers, another suitable type of sensor that detects motion, a type of sensor used for error correction of IMU 808, or some combination thereof. Based on the one or more measurement signals from one or more of position sensors 806, IMU 808 may generate data indicating an estimated current position, elevation, and/or orientation of head-mounted display system 800 relative to an initial position and/or orientation of head-mounted display system 800. For example, sensors 806 may include multiple accelerometers to measure translational motion (forward/back, up/down, left/right) and multiple gyroscopes to measure rotational motion (e.g., pitch, yaw, roll). As described herein, image-capturing subsystem 804 and/or depth-sensing subsystem 802 may generate data indicating an estimated current position and/or orientation of head-mounted display system 800 relative to the real-world environment in which head-mounted display system 800 is used. In some embodiments, augment subsystem 901 may use the estimated current position and/or orientation of head-mounted display system 800 relative to the real-world environment to update the positioning of an augment being presented to a user so that the augment appears to remain attached to an object in the real-world environment.

Tracking subsystem 810 may include one or more processing devices or physical processors that identifies and tracks augmentable objects in a user's real-world environment in accordance with information received from one or more of depth-sensing subsystem 802, image-capturing subsystem 804, sensors 806, IMU 808, and gaze-estimation subsystem 812. In some embodiments, tracking subsystem 810 may monitor augmentable objects that can be observed by depth-sensing subsystem 802, image-capturing subsystem 804, and/or by another system. Tracking subsystem 810 may also receive information from one or more eye-tracking cameras included in some embodiments of augment subsystem 801 to track a user's gaze. In some examples, a user's gaze angle may inform augment subsystem 801 of which augmentable object a user is looking at, which augments should be displayed to a user, and/or which presentational state of an augment should be displayed to a user. Additionally, a user's gaze angle may inform augment subsystem 801 of the user's intentions to interact with an object and/or its associated augment.

FIG. 9 illustrates an exemplary XR system 900 that may be used by a user 912 to augment their experiences of and interactions with objects 922 encountered in a real-world environment 920 of user 912. As shown, XR system 900 may include a wearable device 902 (e.g., head-mounted display system 800) having (1) one or more environment-facing sensors 904 capable of acquiring environmental data about real-world environment 920 and/or objects 922, (2) one or more user-facing sensors 906 capable of acquiring information about user 912, and/or (3) a display 908 (e.g., a heads-up display) capable of displaying augments 910 of objects 922 to user 912. Wearable device 902 may be programmed with one or more of modules 702 from FIG. 7 (e.g., accessing module 704, detecting module 706, determining module 708, and/or presenting module 710) that may, when executed by wearable device 902, enable wearable device 902 to (1) maintain access to database 720 containing object augment 910, (2) detect object 922(1) in real-world environment 920 that is mapped to object augment 910, (3) determine whether a presentation condition associated with object augment 910 is satisfied, (4) prioritize presentation of object augment 910 to user 912 via display 908 system when the presentation condition is satisfied, and (5) constrain presentation of object augment 910 to user 912 when the presentation condition is not satisfied.

As shown, XR system 900 may include a remote server 930 storing some or all of database 720. In this example, wearable device 902 may include one or more of modules 702 and may store all or a portion of database 720, and remote server 930 may include all or a portion of database 720. In at least one example, remote server 930 may represent a global repository of augments that may be accessed by wearable device 902 and any number of additional XR devices. In some examples, wearable-device 902 may query remote server 930 for augments associated with real-world environment 920 (e.g., using a location of real-world environment 920). Additionally or alternatively, wearable device 902 may query remote server 930 for augments associated with objects 922 (e.g., using an identifier of objects 922).

Figure 10:
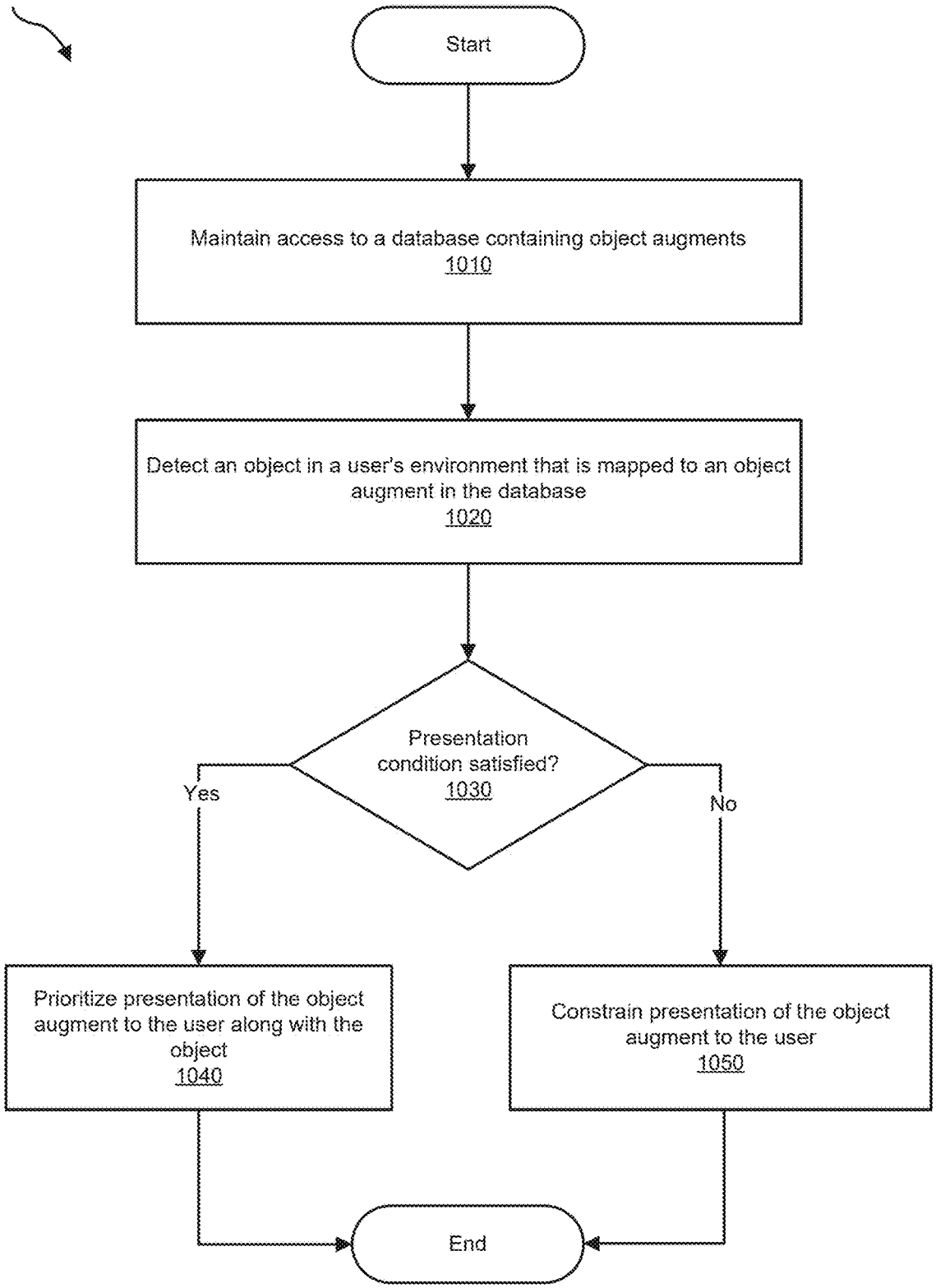
FIG. 10 is a flow diagram of an exemplary method for prioritizing display of object augments according to embodiments of this disclosure.

FIG. 10 is a flow diagram of an exemplary computer-implemented method 1000 for prioritizing display of object augments. The steps shown in FIG. 10 may be performed by any suitable computer-executable code and/or computing system, including the system(s) illustrated in FIGS. 7-9 and 24-32. In one example, each of the steps shown in FIG. 10 may represent an algorithm whose structure includes and/or is represented by multiple sub-steps, examples of which will be provided in greater detail below.

As illustrated in FIG. 10, at step 1010 one or more of the systems described herein may maintain access to a database containing object augments. For example, accessing module 704 may, as part of wearable device 902 in FIG. 9, maintain access to database 720. At step 1020, one or more of the systems described herein may detect an object in a user's environment that is mapped to an object augment in the database. For example, detecting module 706 may, as part of wearable device 902 in FIG. 9, detect objects 922 in real-world environment 920 that are mapped to object augments in database 720. At step 1030, one or more of the systems described herein may determine whether a presentation condition associated with an object augment is satisfied. For example, determining module 708 may, as part of wearable device 902 in FIG. 9, determine whether a presentation condition associated with object augment 910 is satisfied. At step 1040, one or more of the systems described herein may prioritize presentation of an object augment to a user when its associated presentation condition is satisfied. For example, presenting module 710 may, as part of wearable device 902 in FIG. 9, present object augment 910 to user 912 via display 908. At step 1050, one or more of the systems described herein may constrain presentation of an object augment to a user when its associated presentation condition is not satisfied. For example, presenting module 710 may, as part of wearable device 902 in FIG. 9, refrain from presenting object augments associated with objects 922(2)-(N) to user 912 via display 908 when their associated presentation conditions are not satisfied.

The systems described herein may perform steps 1010-1050 in a variety of ways. In some embodiments, the disclosed systems may maintain a remote global database of object augments. In some embodiments, the disclosed systems may create or maintain the remote global database by enabling users to create object augments and/or map object augments to objects that are or may be in their environments and by storing these object augments and mappings in the remote global database for later access by the same or different users.

In some embodiments, the disclosed systems may make some or all of the object augments stored to the remote global database publicly accessible to all users of the disclosed systems and/or make some or all of the object augments stored to the remote global database privately accessible to certain users of the disclosed systems. In some embodiments, the disclosed systems may enable users with access rights to an object augment to share access with other users.

In some embodiments, the disclosed systems may enable users to compile object augments stored in the remote global database into collections that may be offered to and/or selected by other users together rather than individually. Additionally or alternatively, the disclosed systems may automatically compile object augments into collections that may be offered to and/or selected by users.

In some embodiments, the disclosed systems may maintain a local database of object augments. In some embodiments, the disclosed systems may create or maintain the local database by enabling a user to create object augments and/or map object augments to objects that are or may be in their environments and by storing these object augments and mappings in the local database for later access. Additionally or alternatively, the disclosed systems may enable a user to select object augments from a remote global database that should be stored to the local database. In at least one embodiment, the disclosed systems may maintain a local database of object augments by querying a remote global database for object augments that are mapped to objects in the vicinity of a local environment and/or for object augments having attributes known to be preferred by a local user. In at least one embodiment, the disclosed systems may prioritize locally stored augments over remotely stored augments.

The systems described herein may detect objects in a user's environment in a variety of ways. In some embodiments, an object augment may contain or be associated with a known location of an object that the object augment is intended to be presented with, and the disclosed systems may detect the object based on the known location. For example, the disclosed systems may detect the object by detecting when a user's location is near the known location of the object. In some embodiments, the disclosed systems may detect objects based on an associated geolocation and/or a known environmental location (e.g., a known position or orientation relative to other objects in an environment such as the various structures of a building).

In some examples, an object may be mobile, and the disclosed systems may update the known location of the object as it moves. For example, an object augment may be mapped to an athlete on a playing field, and the disclosed systems may update the known location of the athlete such that the object augment may be presented to users in the stands in a way that tracks the athletes movements on the playing field. In another example, an object augment (e.g., a tracking marker or an auditory warning) may be mapped to a teacher's students when the teacher and the students are on a field trip, and the disclosed systems may update the known location of the students such that the object augment may be presented to the teacher in a way that tracks the students' movements on the field trip. For example, the teacher may see a tracking marker above each of their students and/or may hear an auditory warning coming from the direction of a student that has moved beyond a predetermined distance from the teacher.

In some embodiments, the disclosed systems may detect and/or track an object via a suitable object-recognition and/or object-tracking technique. In some examples, the disclosed systems may recognize objects or types of objects in a user's environment in real time. Additionally or alternatively, the disclosed systems may recognize objects or types of objects in a user's environment in response to a request from the user. In some embodiments, the disclosed systems may detect objects using multiple stages of object recognition. For example, the disclosed systems may detect a particular book by performing a type-based recognition operation to detect books in a user's environment and by performing an instance-based recognition operation to determine the identity of each of the previously identified books.

The disclosed systems may determine whether to display an object augment to a user along with an object in the user's environment and/or how to display the object augment to the user using presentation conditions associated with the object augment, the object, and/or the user. In some embodiments, a presentation condition may be based on and/or include explicit or inferred augment-based user preferences. For example, a presentation condition may describe a user's explicit or inferred preferences for certain object augments or types of object augments, explicit or inferred preferences for object augments having certain attributes or ranges of attributes, explicit or inferred preferences for object augments that are mapped to certain objects or types of objects, and/or explicit or inferred preferences for object augments that are mapped to objects having certain attributes and/or ranges of attributes. The disclosed systems may prioritize display of object augments that satisfy augment-based user preferences and/or may constrain display of object augments that do not.

In some embodiments, a presentation condition may be based on and/or include explicit or inferred context-based user preferences. For example, a presentation condition may indicate that the user prefers to have object augments presented to the user when in a certain state (e.g., working) and/or may indicate that the user prefers to not have object augments presented to the user when in a certain other state (e.g., relaxing). Additionally or alternatively, a presentation condition may indicate that the user prefers to have object augments presented to the user when performing certain activities (e.g., hiking) and/or may indicate that the user prefers to not have object augments presented to the user when performing other activities (e.g., reading or watching television). In at least some embodiments, a presentation condition may be based on and/or include explicit or inferred time-based user preferences. For example, a presentation condition may indicate that a user prefers to have object augments presented to the user during certain time periods and/or may indicate that the user prefers to not have object augments presented to the user during certain other time periods. In some embodiments, a presentation condition may be based on and/or include any combination of user preferences. For example, a presentation condition may be based on and/or include any combination of augment-based preferences, state-based user preferences, activity-based user preferences, and/or time-based user preferences.

In some embodiments, the disclosed systems may ignore at least some user preferences when determining whether to present an object augment to a user. For example, the disclosed systems may prioritize display of object augments related to a user's health and/or safety especially when a threat to the user's health and/or safety exceeds a particular threshold. Similarly, the disclosed systems may prioritize display of object augments related to legal mandates (e.g., speed limits).

The disclosed systems may prioritize and/or constrain presentation of an object augment in a variety of ways. In some embodiments, the disclosed systems may prioritize presentation of an object augment by simply presenting the object augment to a user and/or may constrain presentation of the object augment by simply refraining from presenting the object augment. Additionally or alternatively, the disclosed systems may prioritize presentation of an object augment by increasing the prominence (e.g., size, visibility, etc.) of the object augment (e.g., relative to other presented object augments) and/or may constrain presentation of the object augment by decreasing the prominence of the object augment (e.g., relative to other presented object augments).

The disclosed systems may present object augments along with objects in a variety of ways. In some embodiments, the disclosed systems may display an object augment such that it appears locked to the object it is mapped to. For example, the disclosed systems may overlay a translation of a sign on top of the sign in a user's field of view and maintain the position and orientation of the translation relative to the sign even when the user changes position or orientation relative to the sign. Additionally or alternatively, the disclosed systems may display an object augment next to (e.g., above, below, or beside) the object it is mapped to. For example, the disclosed systems may present a name of a place of interest above the place of interest or a description of a painting next to the painting on the wall. When an object augment mapped to an object includes visual elements, the disclosed systems may present the visual elements to a user relative to the user's line of sight to the object. When an object augment includes an auditory element, the disclosed systems may present the auditory element localized to the object it is mapped to.

Figure 11:
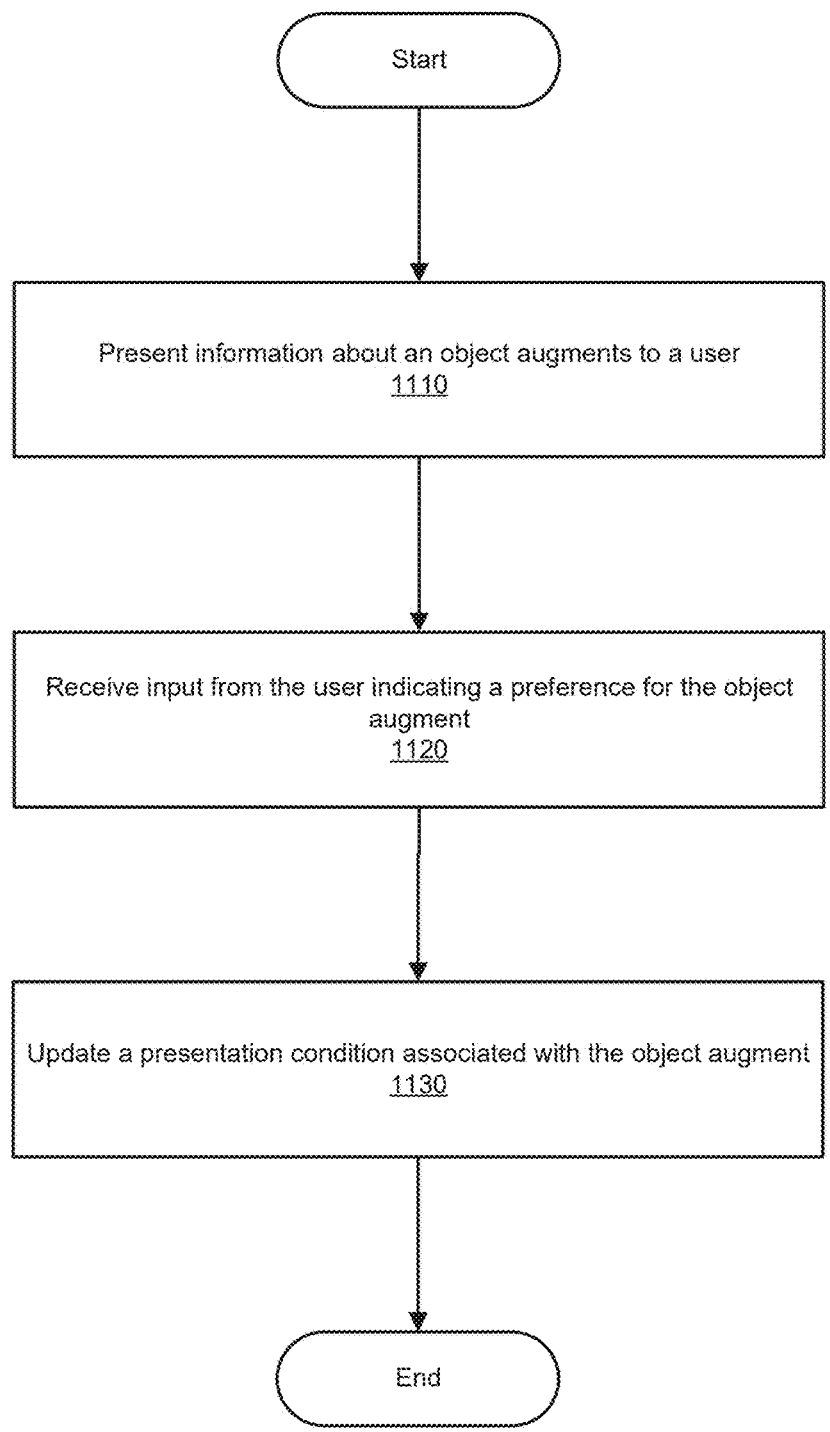
FIG. 11 is a flow diagram of an exemplary method for identifying user preferences for object augments based on explicit input received from users according to embodiments of this disclosure.

As mentioned above, the disclosed systems may base presentation conditions associated with object augments on explicit or implicit user preferences. FIG. 11 is a flow diagram of an exemplary computer-implemented method 1100 for identifying explicit user preferences for object augments. The steps shown in FIG. 11 may be performed by any suitable computer-executable code and/or computing system, including the system(s) illustrated in FIGS. 7-9 and 24-32. In one example, each of the steps shown in FIG. 11 may represent an algorithm whose structure includes and/or is represented by multiple sub-steps, examples of which will be provided in greater detail below.

As illustrated in FIG. 11, at step 1110 one or more of the systems described herein may present information about an object augment to a user. Then at step 1120, one or more of the systems described herein may receive input from the user indicating a preference for the object augment. Finally at step 1130, one or more of the systems described herein may update a presentation condition associated with the object augment. For example, identifying module 112 may, as part of wearable device 902 in FIG. 9, present information about augment 910 to user 912, receive input from user 912 indicating a preference for object augment 910, and update a presentation condition associated with object augment 910 based on the input from user 912.

The systems described herein may perform steps 1110-1130 in a variety of ways. In some embodiments, the disclosed systems may present information about object augments in response to detecting objects in a user's environment that have been mapped to the object augments. If the user has not previously indicated a preference for one of the object augments, the disclosed systems may respond to the detection by presenting information describing the object augments to the user so that the user can explicitly choose to enable one or more of the object augments and/or otherwise indicate any positive or negative preferences for the object augments. Additionally or alternatively, the disclosed systems may select one of the object augments for presentation to the user so that the user may indicate their positive or negative preferences for the object augment through their interaction with the object augment. If the user interacts with the object augment positively, the disclosed systems may record a positive preference for the object augment. On the other hand, if the user interacts with the object augment negatively (e.g., by explicitly rejecting the object augment), the disclosed systems may record a negative preference for the object augment.

Figure 12:
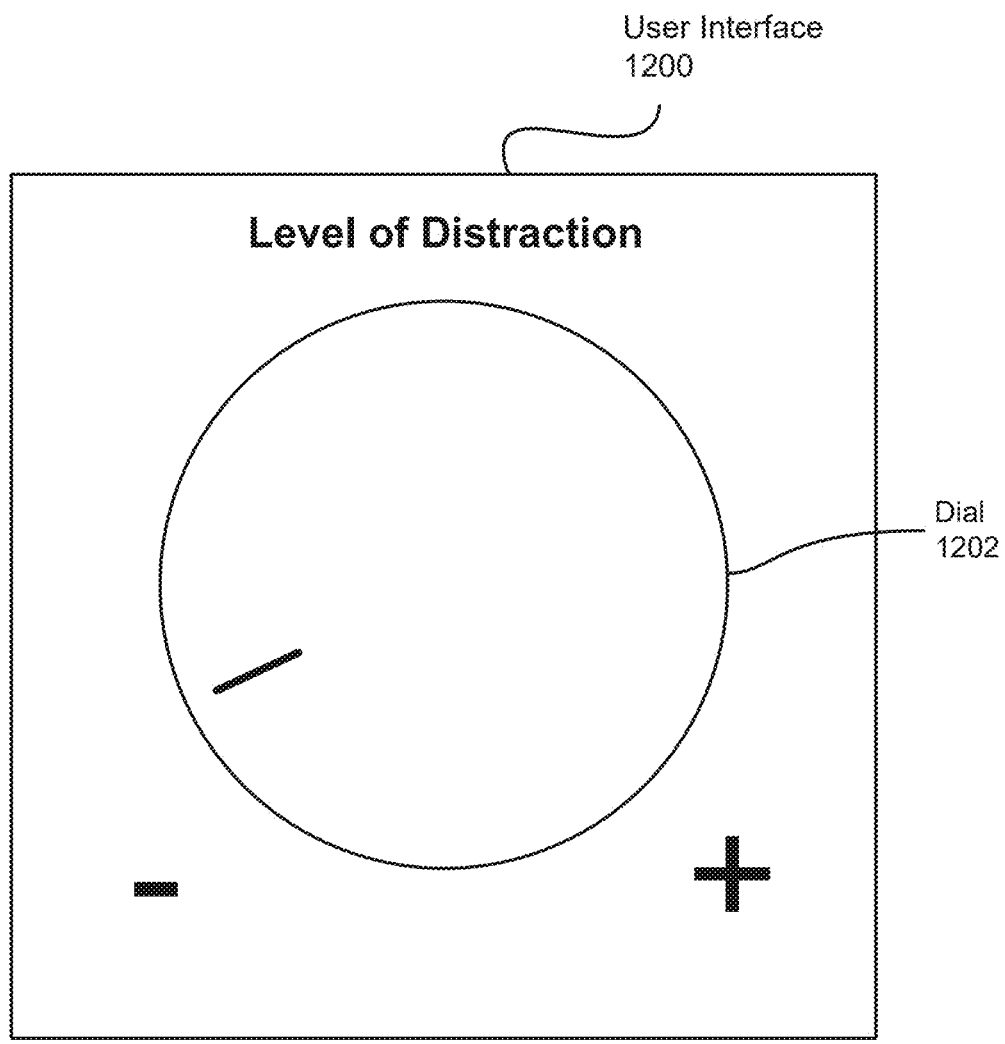
FIG. 12 is an illustration of an exemplary user interface for identifying user preferences for object augments.
Figure 13:
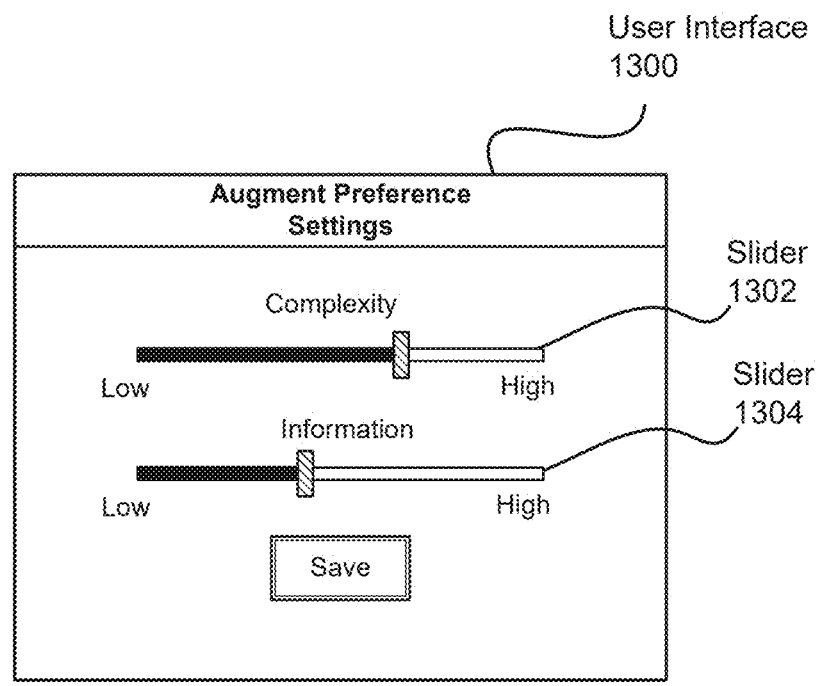
FIG. 13 is an illustration of another exemplary user interface for identifying user preferences for object augments.

In some situations, two or more object augments may have a common attribute. In some embodiments, the disclosed systems may determine a user's preference for one or more of the object augments by presenting an interface that enables the user to indicate a preference for a particular value or range of values of the shared attribute of the object augments. FIGS. 12-18 illustrate exemplary user interfaces that may be presented to a user to determine preferences for object augments. As shown in FIG. 12, an exemplary user interface 1200 may include a dial 1202 that enables a user to indicate a preference for object augments having a particular level of distraction. In this example, a user has indicated a preference for less distracting object augments. As shown in FIG. 13, an exemplary user interface 1300 may include a slider 1302 that enables a user to indicate a preference for object augments based on complexity and a slider 1304 for indicating a preference for object augments based on information content. In this example, a user has indicated a preference for object augments having less than above average complexity and less than below average information.

Figure 14:
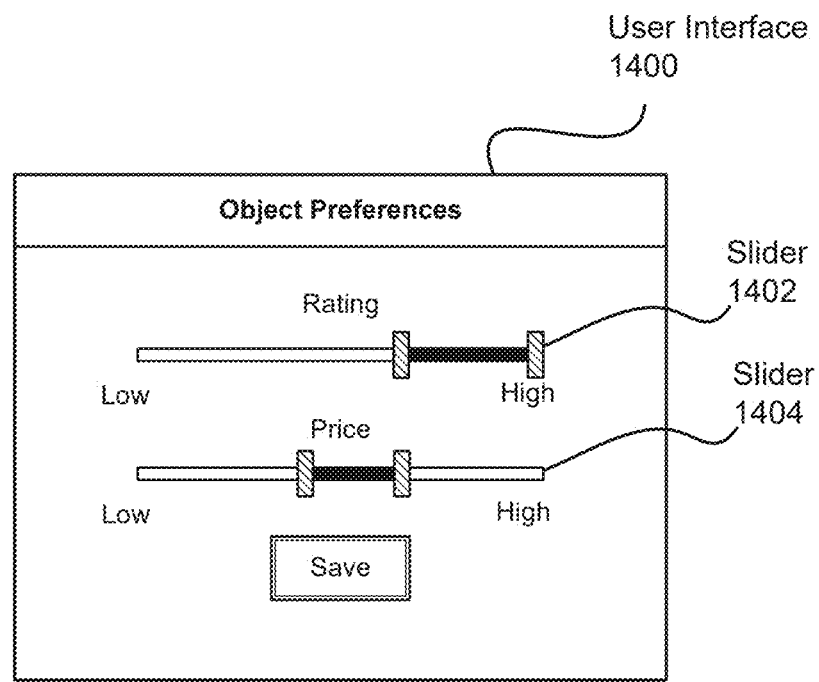
FIG. 14 is an illustration of another exemplary user interface for identifying user preferences for object augments.
Figure 15:
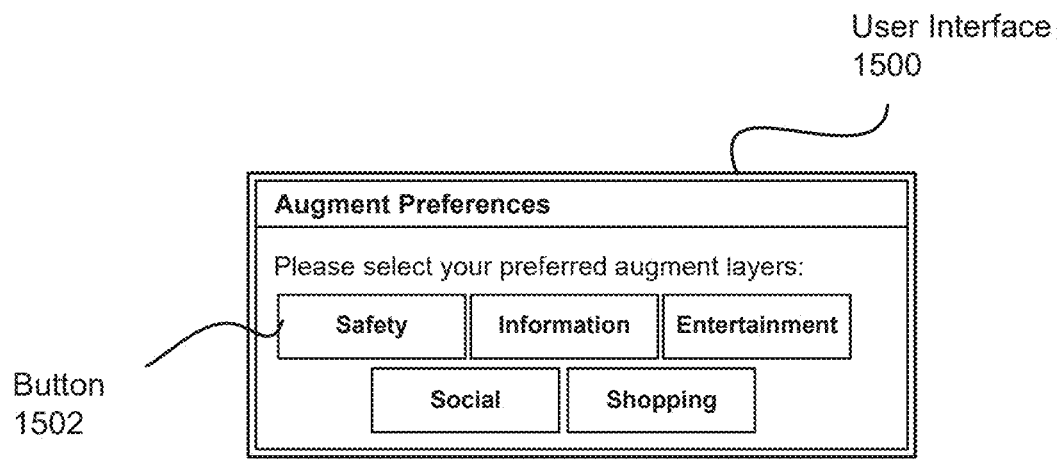
FIG. 15 is an illustration of another exemplary user interface for identifying user preferences for object augments.
Figure 16:
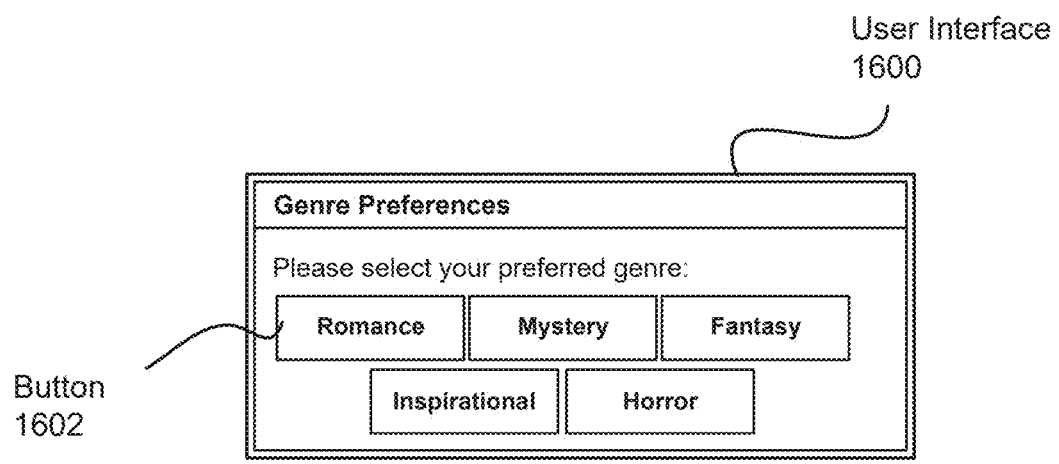
FIG. 16 is an illustration of another exemplary user interface for identifying user preferences for object augments.

As shown in FIG. 14, user interface 1400 may include a slider 1402 that enables a user to indicate a preference for object augments based on object ratings and a slider 1404 for indicating a preference for object augments based on object price. In this example, a user has indicated a preference for object augments associated with objects having above average ratings and average prices. As shown in FIG. 15, an exemplary user interface 1500 may include buttons (e.g., button 1502) that enables a user to indicate a preference for object augments based on object-augment type. In this example, a user may indicate a preference for safety augments, information augments, entertainment augments, social augments, and/or shopping augments. As shown in FIG. 16, an exemplary user interface 1600 may include buttons (e.g., button 1602) that enables a user to indicate a preference for object augments based on object types. In this example, a user may indicate a preference for object augments mapped to romance objects, object augments mapped to mystery objects, object augments mapped to fantasy objects, object augments mapped to inspirational augments, and/or object augments mapped to horror augments.

Figure 17:
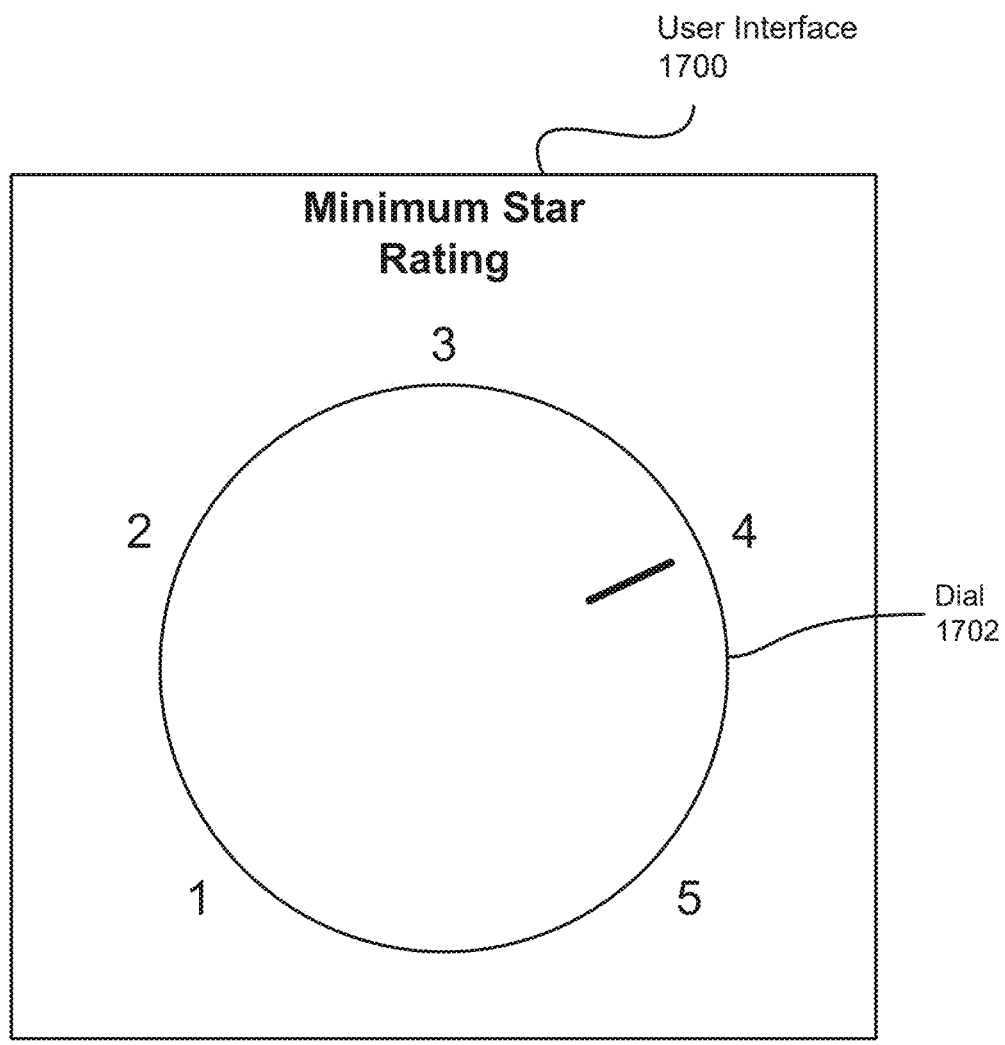
FIG. 17 is an illustration of another exemplary user interface for identifying user preferences for object augments.

As shown in FIG. 17, an exemplary user interface 1700 may include a dial 1702 that enables a user to indicate a preference for object augments that have been mapped to objects having a particular rating. In this example, a user has indicated a preference for object augments that have been mapped to objects having a rating of greater than 4 stars. In some embodiments, the disclosed systems may record this preference and later use it to prioritize display of object augments mapped to objects having ratings of 4 or more stars over object augments mapped to objects having ratings of less than 4 stars.

Figure 18:
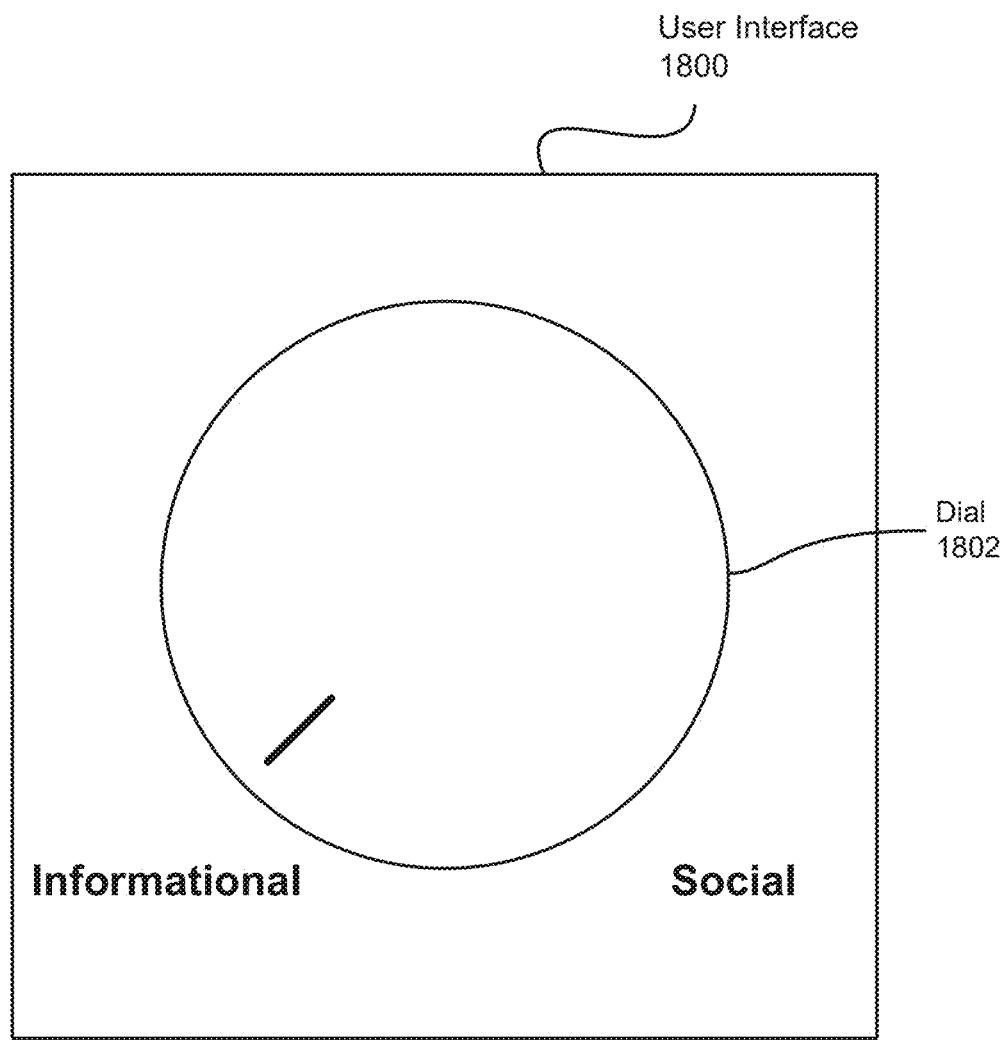
FIG. 18 is an illustration of another exemplary user interface for identifying user preferences for object augments.

In some situations, two or more object augments may have two common attributes. In some embodiments, the disclosed systems may determine a user's preference for one or more of the object augments by presenting an interface that enables the user to indicate a preference for one attribute over the other. As shown in FIG. 18, an exemplary user interface 1800 may include a dial 1802 that enables a user to indicate a preference for informational augments or social augments. In this example, a user has indicated a preference for object augments that have more informational value. In some embodiments, the disclosed systems may record this preference and later use it to prioritize display of informational augments over social augments.

In some embodiments, the disclosed systems may enable users to browse or search for available object augments and may identify preferences for object augments based on the users' browsing and search activities. For example, the disclosed systems may enable browsing or searching for object augments mapped to a particular object (e.g., a location), object augments mapped to a particular type of object, object augments mapped to a particular type of object augment, object augments mapped to objects having particular attributes, and/or object augments having particular attributes. If a user browses or searches for object augments that are mapped to a particular object, the disclosed systems may record the user's preference for object augments that are mapped to the object. If a user browses or searches for object augments that are mapped to a particular type of object, the disclosed systems may record the user's preference for object augments that are mapped to the type of object. If a user browses or searches for object augments that are mapped to a particular type of object augment, the disclosed systems may record the user's preference for object augments of the type. If a user browses or searches for object augments that are mapped to objects having particular attributes, the disclosed systems may record the user's preference for object augments that are mapped to objects with the attribute. If a user browses or searches for object augments having a particular attribute, the disclosed systems may record the user's preference for object augments having a particular attribute.

Figure 19:
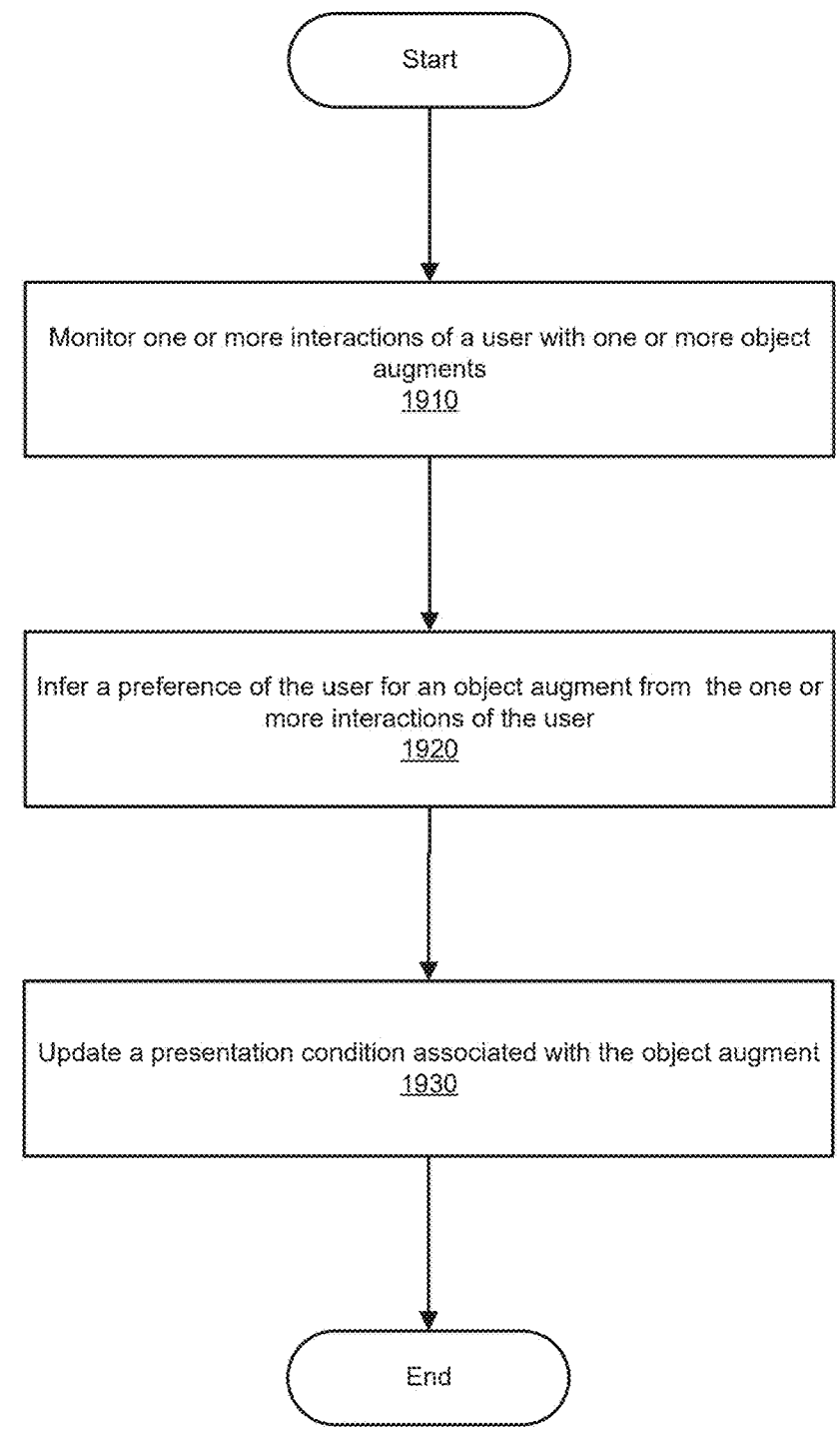
FIG. 19 is a flow diagram of an exemplary method for inferring user preferences for object augments based on user interactions according to embodiments of this disclosure.

In some embodiments, the disclosed systems may transparently and/or automatically identify user preferences for object augments. FIG. 19 is a flow diagram of an exemplary computer-implemented method 1900 for identifying a preference of the user for object augments. The steps shown in FIG. 19 may be performed by any suitable computer-executable code and/or computing system, including the system(s) illustrated in FIGS. 7-9 and 24-32. In one example, each of the steps shown in FIG. 19 may represent an algorithm whose structure includes and/or is represented by multiple sub-steps, examples of which will be provided in greater detail below.

As illustrated in FIG. 19, at step 1910 one or more of the systems described herein may monitor one or more interactions of a user with one or more object augments. At step 1920, one or more of the systems described herein may then infer a preference of the user for an object augment from the one or more interactions of the user. At step 1930, one or more of the systems described herein may update a presentation condition associated with the object augment. For example, identifying module 112 may, as part of wearable device 902 in FIG. 9, monitor one or more interactions of user 912 with one or more of the object augments stored to database 720, infer a preference of user 912 for object augment 910 from the one or more interactions, and update a presentation condition associated with object augment 910 for later use in prioritizing display of object augment 910.

The systems described herein may perform step 1910-1930 in a variety of ways. In one embodiment, the disclosed systems may monitor user interactions with object augments as part of presenting the object augments to users (e.g., according to method 1000 in FIG. 10). If a user engages with a presented object augment, the disclosed systems may infer that the user prefers the object augment and/or object augments that have similar attributes. On the other hand, if a user ignores or rejects a presented object augment, the disclosed systems may infer that the user has a negative preference for the object augment and/or object augments that have similar attributes. During some periods of time, the disclosed systems may present two object augments that differ in some way. If the user engages with one of the object augments and not the other object augment, the disclosed systems may infer that the user prefers the object augment over the other object augments and/or that the user prefers object augments that are similar to the object augment over object augments that are similar to the other object augment. For example, if the disclosed systems present information augments and social augments to a user and the user more frequently engages with the social augments, the disclosed systems may infer a preference for social augments over information augments and may prioritize future presentation of social augments over informational augments.

Since users may exhibit different behaviors and preferences in different situations, the disclosed systems may consider the context of users' interactions with object augments when identifying the users' preferences. Examples of contextual considerations that may be useful in determining users' preferences for an object augment or similar object augments include, without limitation, the time periods during which the users preferred an object augment, the time periods during which the users did not prefer the object augment, the states or roles the users were in when the users preferred the object augment, the states or roles the users were in when the users did not prefer the object augment, the activities the users were performing when the users preferred the object augment, the activities the users were performing when the users did not prefer the object augment, the users' familiarity with the object augment or its associated object when the users preferred the object augment, the users' familiarity with the object augment or its associated object when the users did not prefer the object augment, the type of object the object augment was presented with when the users showed a preference for the object augment, and/or the type of object the object augment was presented with when the users showed a negative preference for the object augment.

Figure 20:
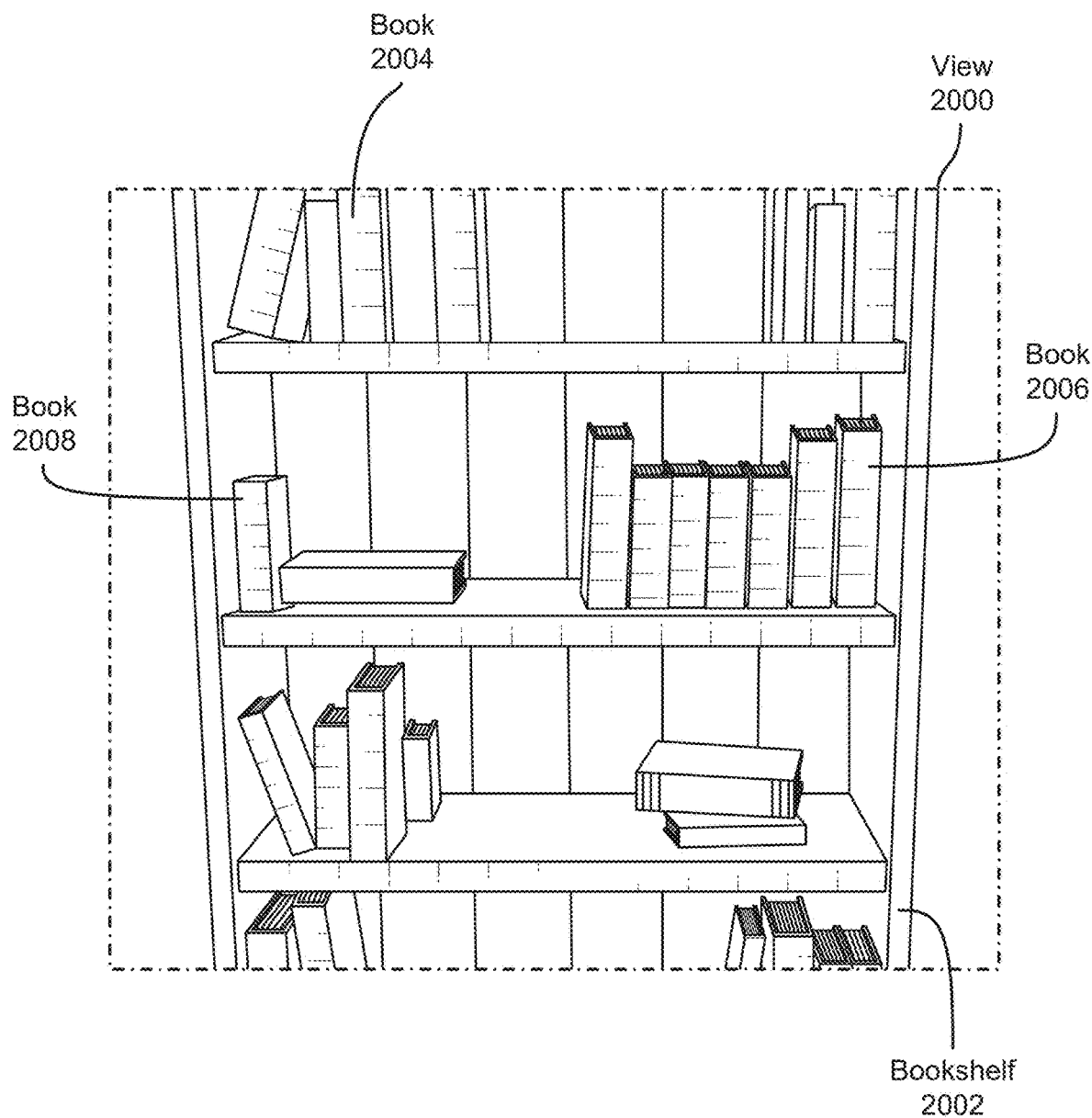
FIG. 20 is an illustration of an exemplary augmented-reality view of a bookshelf containing no visible object augments.
Figure 21:
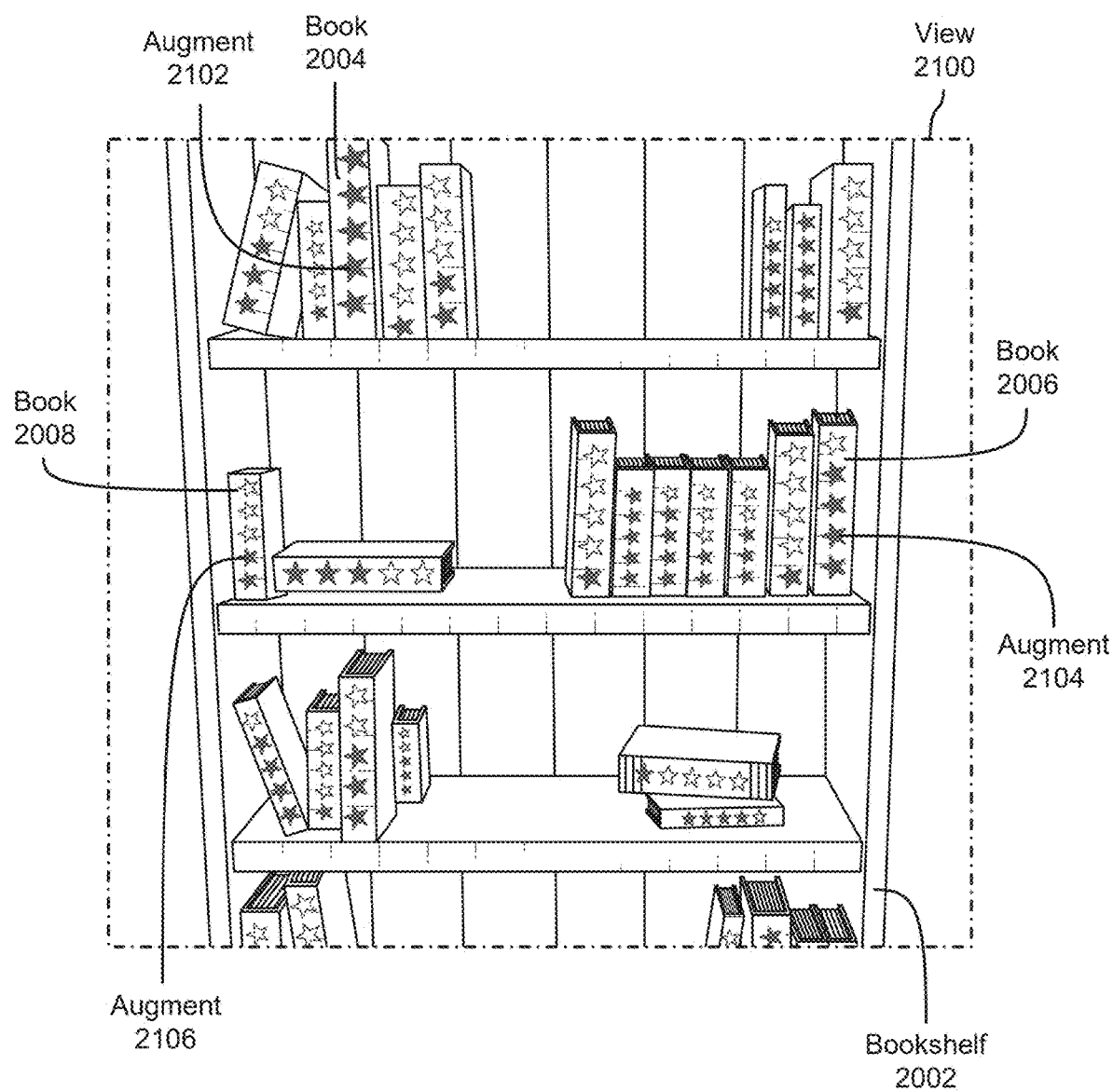
FIG. 21 is an illustration of another augmented-reality view of the bookshelf of FIG. 20 with object augments overlaying all visible books.
Figure 22:
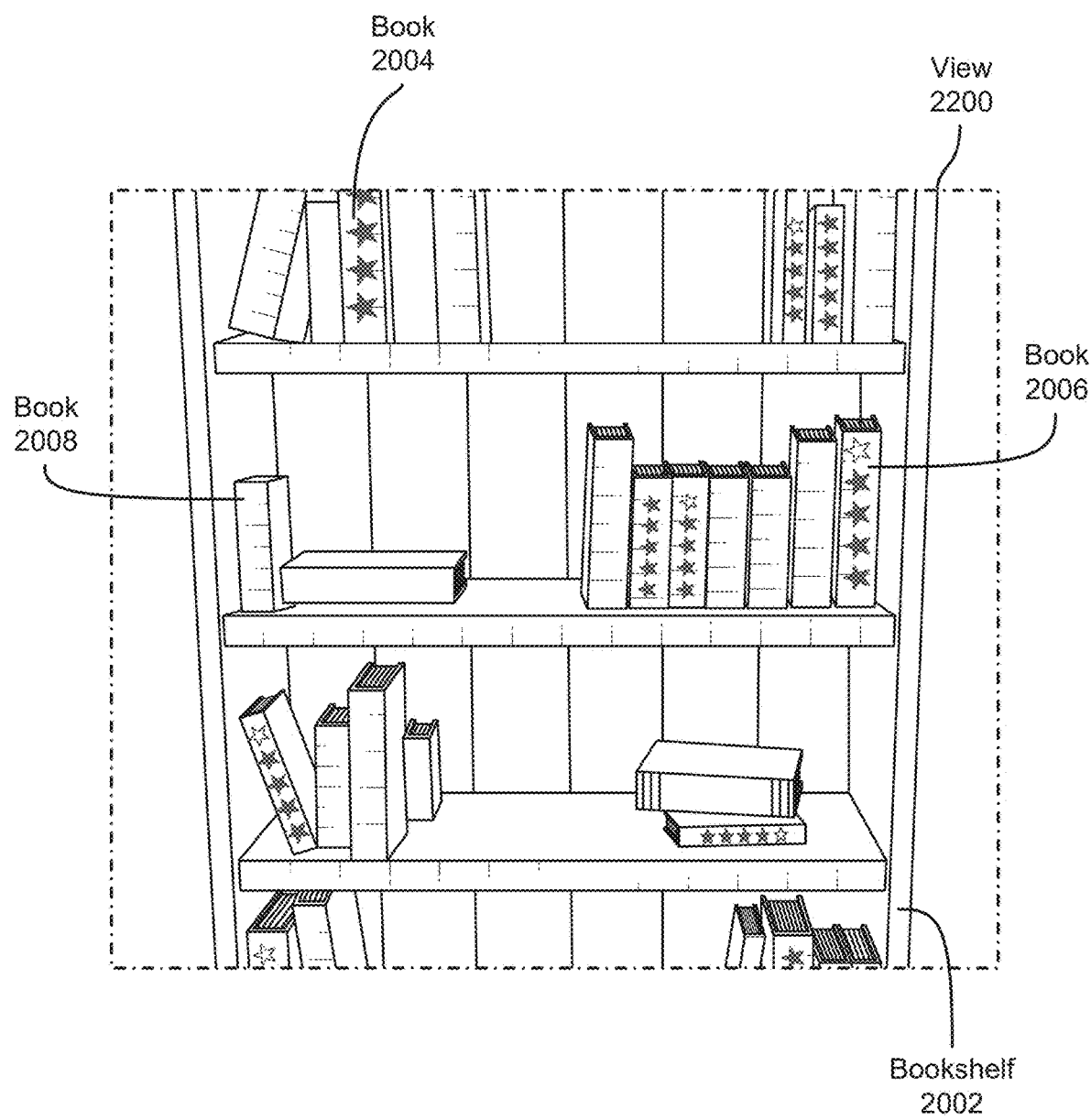
FIG. 22 is an illustration of another augmented-reality view of the bookshelf of FIG. 20 with object augments overlaying less than all visible books.
Figure 23:
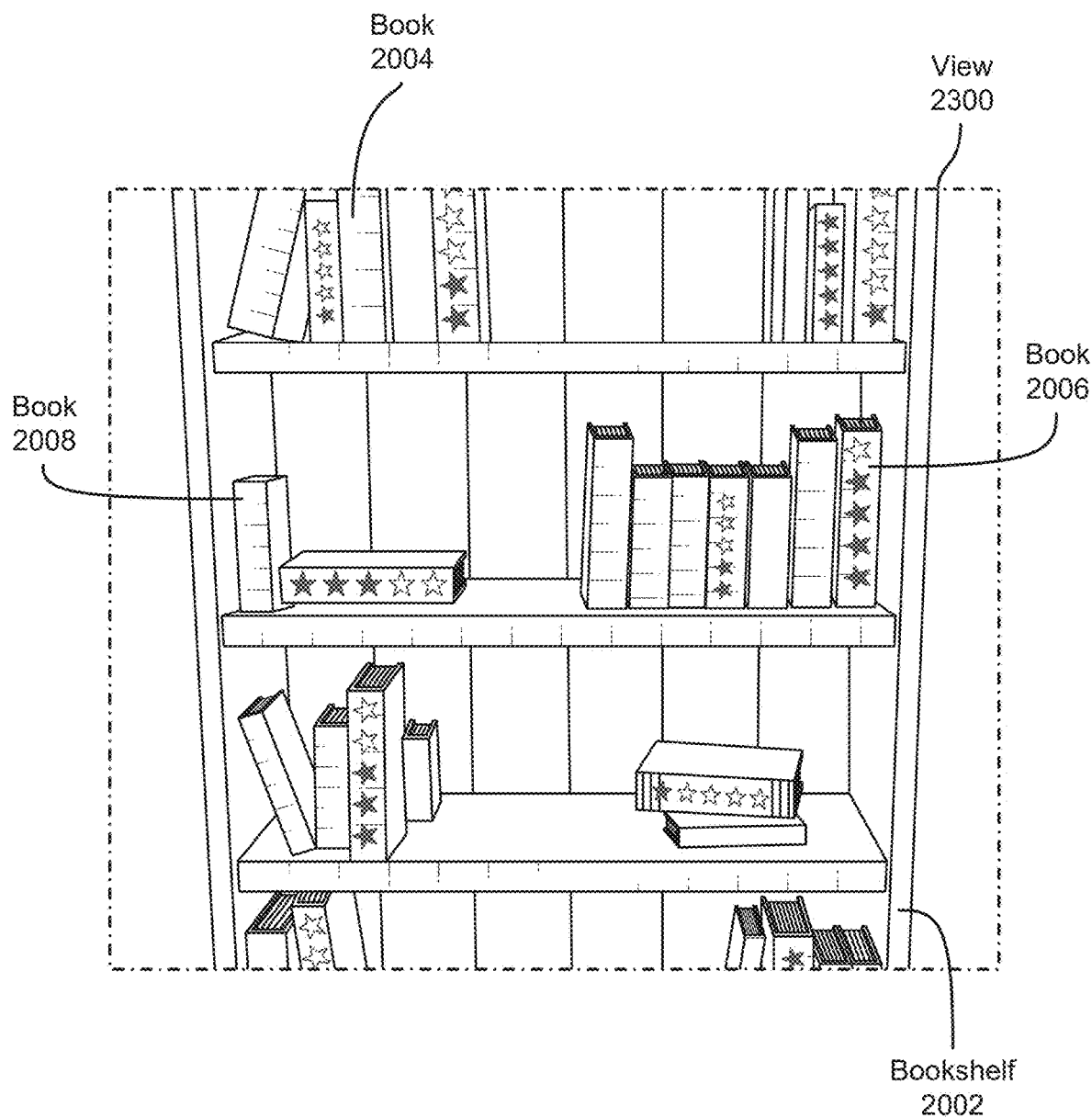
FIG. 23 is an illustration of another augmented-reality view of the bookshelf of FIG. 20 with object augments overlaying less than all visible books.

FIGS. 20-24 illustrate an example of how the disclosed systems may augment a user's experience with books on a bookshelf 2002. FIG. 20 illustrates an exemplary unaugmented view 2000 of bookshelf 2002. At this point in time, the disclosed systems may have detected books (e.g., books 2004, 2006, and 2008) on bookshelf 2002 but may not have presented any object augments to the user. FIG. 21 illustrates an exemplary augmented view 2100 of bookshelf 2002. In this example, the disclosed systems may have begun presenting object augments along with each book on bookshelf 2002. In this example, each augment may represent or convey a rating of the book to which it is attached. For example, an augment 2102 overlaying book 2004 may convey a five-star rating of book 2004, an augment 2104 overlaying book 2006 may convey a four-star rating of book 2006, and an augment 2106 overlaying book 2008 may convey a two-star rating of book 2008. Between exemplary views 2000 and 2100, the disclosed systems may have notified the user of the availability of rating augments for the books on bookshelf 2002 and may have begun presenting the rating augments along with the books on bookshelf 2002 in response to the user enabling the rating augments.

Between exemplary views 2100 and 2200 or 2300, the disclosed systems may have presented an option to the user to indicate what object augments the user prefers to see. For example, before presenting view 2200 to the user, the disclosed system may have presented user interface 1700 to the user. After the user indicated a preference for books with ratings of four stars or more, the disclosed systems may have begun refraining from presenting any object augment that was mapped to a book with a rating of less than four stars. For example, the disclosed systems may have stopped presenting augment 2106 to the user. In another example, before presenting view 2300 to the user, the disclosed system may have presented user interface 1600 to the user. After the user indicated a preference for romance books, the disclosed systems may have begun refraining from presenting any object augment that was mapped to a book that did not fall into the romance genre. For example, the disclosed systems may have stopped presenting augments 2102 and 2106 to the user.

As explained above, embodiments of the present disclosure may prioritize the presentation (e.g., visibility or visual prominence) of object augments, especially in augment-rich environments. For example, when a user encounters an object that has been mapped to many object augments, embodiments of the present disclosure may determine which of the object augments should be presented to the user and which of the object augments should not be presented to the user. Similarly, when a user encounters an environment with many augmentable objects, embodiments of the present disclosure may determine which of the objects should or should not be augmented for the user. The disclosed systems and methods may prioritize presentation of object augments to users based on a variety of factors such as explicit and/or implicit user preferences, past user interactions or behaviors, contextual clues, safety concerns, access rights, user familiarity, user relevance (e.g., relevance to a particular user state or role), user importance, user states, and/or user roles. By prioritizing presentation of object augments, the disclosed systems and methods may adapt to users wants and needs without overwhelming or burdening the users with excessive, irrelevant, and/or unwanted distractions.

EXAMPLE EMBODIMENTS

Example 1: A computer-implemented method may include (1) maintaining, by an extended-reality system, access to a database containing a plurality of object augments, each of the plurality of object augments being mapped to one or more objects along with which the object augment is configured to be presented to and sensed by a user via the extended-reality system, (2) detecting, by the extended-reality system, an object in the user's environment, the object being mapped to at least one object augment in the database, (3) determining, by the extended-reality system, whether a presentation condition associated with the at least one object augment is satisfied, (4) when the presentation condition is satisfied, prioritizing presentation of the at least one object augment to the user via the extended-reality system, and (5) when the presentation condition is not satisfied, constraining presentation of the at least one object augment to the user via the extended-reality system.

Example 2: The computer-implemented method of Example 1 where (1) the at least one object augment includes information associated with the object, an action associated with the object, and/or an interface through which the user initiates the action and (2) the computer-implemented method further includes identifying, by the extended-reality system, a preference of the user for the at least one object augment where the presentation condition is based at least in part on the preference of the user for the at least one object augment.

Example 3: The computer-implemented method of any of Examples 1-2 where identifying the preference of the user for the at least one object augment includes receiving, by the extended-reality system, input from the user indicating the preference of the user for the at least one object augment.

Example 4: The computer-implemented method of any of Examples 1-3 where identifying the preference of the user for the at least one object augment includes (1) monitoring, by the extended-reality system, one or more interactions of the user with one or more of the plurality of object augments and (2) inferring, by the extended-reality system, the preference of the user for the at least one object augment from at least the one or more interactions of the user.

Example 5: The computer-implemented method of any of Examples 1-4 where (1) monitoring the one or more interactions of the user with one or more of the plurality of object augments includes monitoring one or more contextual conditions of the one or more interactions and (2) inferring the preference of the user for the at least one object augment includes (a) determining that the preference of the user for the at least one object augment exists when the one or more contextual conditions are present and (b) basing, by the extended-reality system, the presentation condition on the one or more contextual conditions.

Example 6: The computer-implemented method of any of Examples 1-5 where (1) the at least one object augment includes a collection of related object augments that have at least one attribute in common and (2) the preference of the user for the at least one object augment includes a preference for object augments having the at least one attribute.

Example 7: The computer-implemented method of any of Examples 1-6 where (1) the presentation condition is based at least in part on the user being in a predetermined state and (2) determining whether the presentation condition is satisfied includes determining whether the user is presently in the predetermined state.

Example 8: The computer-implemented method of any of Examples 1-7 where the predetermined state was defined at least in part by the user or another entity associated with the at least one object augment.

Example 9: The computer-implemented method of any of Examples 1-8 further including (1) monitoring, by the extended-reality system, a plurality of states of the user, (2) while monitoring the plurality of states of the user, identifying a preference of the user, while the user is in the predetermined state, for the at least one object augment and/or at least one additional object augment that shares a common attribute with the at least one object augment, and (3) basing, by the extended-reality system, the presentation condition on the predetermined state.

Example 10: The computer-implemented method of any of Examples 1-9 where (1) the at least one object augment is associated with a graded attribute and (2) the presentation condition is based at least in part on the graded attribute satisfying a predetermined threshold.

Example 11: The computer-implemented method of any of Examples 1-10 where the graded attribute includes a priority level, a relevance level, a hazard level, a familiarity level, a distance, a size, a complexity, a distractibility, an informativeness, an age, a reading level, and/or an educational level.

Example 12: The computer-implemented method of any of Examples 1-11 where (1) the at least one object augment is associated with one or more identifiers of the object and (2) the one or more identifiers are used to detect the object in the user's environment.

Example 13: The computer-implemented method of any of Examples 1-12 where the identifier includes (1) a geolocation, (2) a real-world location, and/or (3) an object-identifying function.

Example 14: The computer-implemented method of any of Examples 1-13 where the presentation condition is based on one or more of (1) a right of the user to access the at least one object augment, (2) an indication of relevance to the user of the at least one object augment to the user, and/or (3) a threat to the user's safety being greater than a predetermined threshold.

Example 15: An extended-reality system may include (1) at least one physical processor and (2) physical memory storing computer-executable instructions that, when executed by the physical processor, cause the physical processor to (a) maintain access to a database containing a plurality of object augments, each of the plurality of object augments being mapped to one or more objects along with which the object augment is configured to be presented to and sensed by a user via the extended-reality system, (b) detect an object in the user's environment, the object being mapped to at least one object augment in the database, (c) determine whether a presentation condition associated with the at least one object augment is satisfied, (d) when the presentation condition is satisfied, prioritize presentation of the at least one object augment to the user via the extended-reality system, and (e) when the presentation condition is not satisfied, constrain presentation of the at least one object augment to the user via the extended-reality system.

Example 16: The extended-reality system of Example 15 where the physical memory includes additional computer-executable instructions that, when executed by the physical processor, cause the physical processor to identify a preference of the user for the at least one object augment where the presentation condition is based at least in part on the preference of the user for the at least one object augment.

Example 17: The extended-reality system of any of Examples 15-16 where identifying the preference of the user for the at least one object augment includes (1) monitoring, by the extended-reality system, one or more interactions of the user with one or more of the plurality of object augments and (2) inferring, by the extended-reality system, the preference of the user for the at least one object augment from at least the one or more interactions of the user.

Example 18: The extended-reality system of any of Examples 15-17 where (1) monitoring the one or more interactions of the user with one or more of the plurality of object augments includes monitoring one or more contextual conditions of the one or more interactions and (2) inferring the preference of the user for the at least one object augment includes (a) determining that the preference of the user for the at least one object augment exists when the one or more contextual conditions are present and (b) basing, by the extended-reality system, the presentation condition on the one or more contextual conditions.

Example 19: The extended-reality system of any of Examples 15-18 where (1) the presentation condition is based at least in part on the user being in a predetermined state and (2) determining whether the presentation condition is satisfied includes determining whether the user is presently in the predetermined state.

Example 20: A non-transitory computer-readable medium may include one or more computer-executable instructions that, when executed by at least one processor of an extended-reality system, cause the extended-reality system to (1) maintain access to a database containing a plurality of object augments, each of the plurality of object augments being mapped to one or more objects along with which the object augment is configured to be presented to and sensed by a user via the extended-reality system, (2) detect an object in the user's environment, the object being mapped to at least one object augment in the database, (3) determine whether a presentation condition associated with the at least one object augment is satisfied, (4) when the presentation condition is satisfied, prioritize presentation of the at least one object augment to the user via the extended-reality system, and (5) when the presentation condition is not satisfied, constrain presentation of the at least one object augment to the user via the extended-reality system.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 2400 in FIG. 24) or that visually immerses a user in an artificial reality (such as, e.g., virtual-reality system 2500 in FIG. 25). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 24:
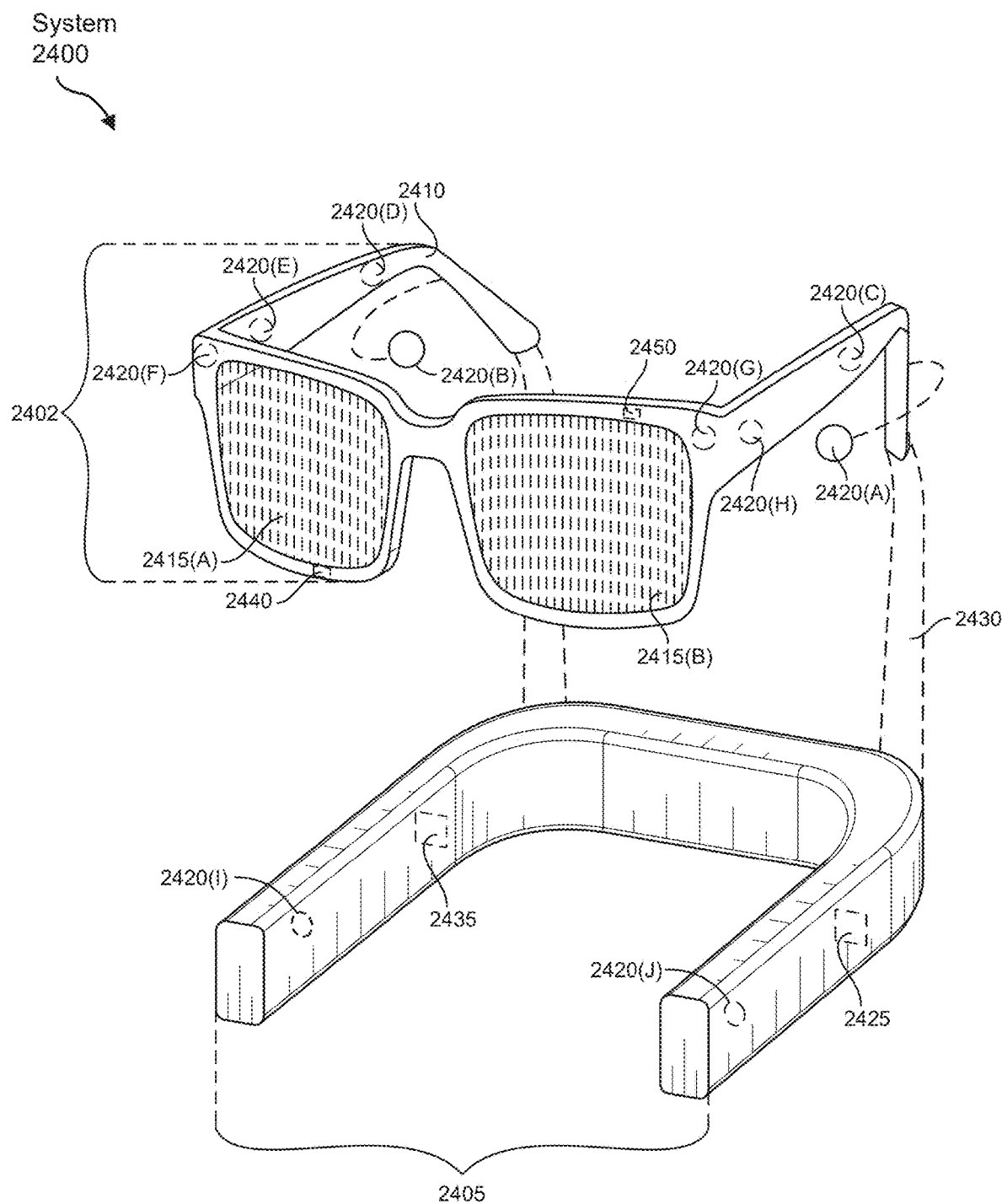
FIG. 24 is an illustration of exemplary augmented-reality glasses that may be used in connection with embodiments of this disclosure.

Turning to FIG. 24, augmented-reality system 2400 may include an eyewear device 2402 with a frame 2410 configured to hold a left display device 2415(A) and a right display device 2415(B) in front of a user's eyes. Display devices 2415(A) and 2415(B) may act together or independently to present an image or series of images to a user. While augmented-reality system 2400 includes two displays, embodiments of this disclosure may be implemented in augmented-reality systems with a single NED or more than two NEDs.

In some embodiments, augmented-reality system 2400 may include one or more sensors, such as sensor 2440. Sensor 2440 may generate measurement signals in response to motion of augmented-reality system 2400 and may be located on substantially any portion of frame 2410. Sensor 2440 may represent one or more of a variety of different sensing mechanisms, such as a position sensor, an inertial measurement unit (IMU), a depth camera assembly, a structured light emitter and/or detector, or any combination thereof. In some embodiments, augmented-reality system 2400 may or may not include sensor 2440 or may include more than one sensor. In embodiments in which sensor 2440 includes an IMU, the IMU may generate calibration data based on measurement signals from sensor 2440. Examples of sensor 2440 may include, without limitation, accelerometers, gyroscopes, magnetometers, other suitable types of sensors that detect motion, sensors used for error correction of the IMU, or some combination thereof.

In some examples, augmented-reality system 2400 may also include a microphone array with a plurality of acoustic transducers 2420(A)-2420(J), referred to collectively as acoustic transducers 2420. Acoustic transducers 2420 may represent transducers that detect air pressure variations induced by sound waves. Each acoustic transducer 2420 may be configured to detect sound and convert the detected sound into an electronic format (e.g., an analog or digital format). The microphone array in FIG. 24 may include, for example, ten acoustic transducers: 2420(A) and 2420(B), which may be designed to be placed inside a corresponding ear of the user, acoustic transducers 2420(C), 2420(D), 2420(E), 2420(F), 2420(G), and 2420(H), which may be positioned at various locations on frame 2410, and/or acoustic transducers 2420(I) and 2420(J), which may be positioned on a corresponding neckband 2405.

In some embodiments, one or more of acoustic transducers 2420(A)-(J) may be used as output transducers (e.g., speakers). For example, acoustic transducers 2420(A) and/or 2420(B) may be earbuds or any other suitable type of headphone or speaker.

The configuration of acoustic transducers 2420 of the microphone array may vary. While augmented-reality system 2400 is shown in FIG. 24 as having ten acoustic transducers 2420, the number of acoustic transducers 2420 may be greater or less than ten. In some embodiments, using higher numbers of acoustic transducers 2420 may increase the amount of audio information collected and/or the sensitivity and accuracy of the audio information. In contrast, using a lower number of acoustic transducers 2420 may decrease the computing power required by an associated controller 2450 to process the collected audio information. In addition, the position of each acoustic transducer 2420 of the microphone array may vary. For example, the position of an acoustic transducer 2420 may include a defined position on the user, a defined coordinate on frame 2410, an orientation associated with each acoustic transducer 2420, or some combination thereof.

Acoustic transducers 2420(A) and 2420(B) may be positioned on different parts of the user's ear, such as behind the pinna, behind the tragus, and/or within the auricle or fossa. Or, there may be additional acoustic transducers 2420 on or surrounding the ear in addition to acoustic transducers 2420 inside the ear canal. Having an acoustic transducer 2420 positioned next to an ear canal of a user may enable the microphone array to collect information on how sounds arrive at the ear canal. By positioning at least two of acoustic transducers 2420 on either side of a user's head (e.g., as binaural microphones), augmented-reality device 2400 may simulate binaural hearing and capture a 3D stereo sound field around about a user's head. In some embodiments, acoustic transducers 2420(A) and 2420(B) may be connected to augmented-reality system 2400 via a wired connection 2430, and in other embodiments acoustic transducers 2420(A) and 2420(B) may be connected to augmented-reality system 2400 via a wireless connection (e.g., a BLUETOOTH connection). In still other embodiments, acoustic transducers 2420(A) and 2420(B) may not be used at all in conjunction with augmented-reality system 2400.

Acoustic transducers 2420 on frame 2410 may be positioned in a variety of different ways, including along the length of the temples, across the bridge, above or below display devices 2415(A) and 2415(B), or some combination thereof. Acoustic transducers 2420 may also be oriented such that the microphone array is able to detect sounds in a wide range of directions surrounding the user wearing the augmented-reality system 2400. In some embodiments, an optimization process may be performed during manufacturing of augmented-reality system 2400 to determine relative positioning of each acoustic transducer 2420 in the microphone array.

In some examples, augmented-reality system 2400 may include or be connected to an external device (e.g., a paired device), such as neckband 2405. Neckband 2405 generally represents any type or form of paired device. Thus, the following discussion of neckband 2405 may also apply to various other paired devices, such as charging cases, smart watches, smart phones, wrist bands, other wearable devices, hand-held controllers, tablet computers, laptop computers, other external compute devices, etc.

As shown, neckband 2405 may be coupled to eyewear device 2402 via one or more connectors. The connectors may be wired or wireless and may include electrical and/or non-electrical (e.g., structural) components. In some cases, eyewear device 2402 and neckband 2405 may operate independently without any wired or wireless connection between them. While FIG. 24 illustrates the components of eyewear device 2402 and neckband 2405 in example locations on eyewear device 2402 and neckband 2405, the components may be located elsewhere and/or distributed differently on eyewear device 2402 and/or neckband 2405. In some embodiments, the components of eyewear device 2402 and neckband 2405 may be located on one or more additional peripheral devices paired with eyewear device 2402, neckband 2405, or some combination thereof.

Pairing external devices, such as neckband 2405, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2400 may be provided by a paired device or shared between a paired device and an eyewear device, thus reducing the weight, heat profile, and form factor of the eyewear device overall while still retaining desired functionality. For example, neckband 2405 may allow components that would otherwise be included on an eyewear device to be included in neckband 2405 since users may tolerate a heavier weight load on their shoulders than they would tolerate on their heads. Neckband 2405 may also have a larger surface area over which to diffuse and disperse heat to the ambient environment. Thus, neckband 2405 may allow for greater battery and computation capacity than might otherwise have been possible on a stand-alone eyewear device. Since weight carried in neckband 2405 may be less invasive to a user than weight carried in eyewear device 2402, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 2405 may be communicatively coupled with eyewear device 2402 and/or to other devices. These other devices may provide certain functions (e.g., tracking, localizing, depth mapping, processing, storage, etc.) to augmented-reality system 2400. In the embodiment of FIG. 24, neckband 2405 may include two acoustic transducers (e.g., 2420(I) and 2420(J)) that are part of the microphone array (or potentially form their own microphone subarray). Neckband 2405 may also include a controller 2425 and a power source 2435.

Acoustic transducers 2420(I) and 2420(J) of neckband 2405 may be configured to detect sound and convert the detected sound into an electronic format (analog or digital). In the embodiment of FIG. 24, acoustic transducers 2420(I) and 2420(J) may be positioned on neckband 2405, thereby increasing the distance between the neckband acoustic transducers 2420(I) and 2420(J) and other acoustic transducers 2420 positioned on eyewear device 2402. In some cases, increasing the distance between acoustic transducers 2420 of the microphone array may improve the accuracy of beamforming performed via the microphone array. For example, if a sound is detected by acoustic transducers 2420(C) and 2420(D) and the distance between acoustic transducers 2420(C) and 2420(D) is greater than, e.g., the distance between acoustic transducers 2420(D) and 2420(E), the determined source location of the detected sound may be more accurate than if the sound had been detected by acoustic transducers 2420(D) and 2420(E).

Controller 2425 of neckband 2405 may process information generated by the sensors on neckband 2405 and/or augmented-reality system 2400. For example, controller 2425 may process information from the microphone array that describes sounds detected by the microphone array. For each detected sound, controller 2425 may perform a direction-of-arrival (DOA) estimation to estimate a direction from which the detected sound arrived at the microphone array. As the microphone array detects sounds, controller 2425 may populate an audio data set with the information.

In embodiments in which augmented-reality system 2400 includes an inertial measurement unit, controller 2425 may compute all inertial and spatial calculations from the IMU located on eyewear device 2402. A connector may convey information between augmented-reality system 2400 and neckband 2405 and between augmented-reality system 2400 and controller 2425. The information may be in the form of optical data, electrical data, wireless data, or any other transmittable data form. Moving the processing of information generated by augmented-reality system 2400 to neckband 2405 may reduce weight and heat in eyewear device 2402, making it more comfortable to the user.

Power source 2435 in neckband 2405 may provide power to eyewear device 2402 and/or to neckband 2405. Power source 2435 may include, without limitation, lithium ion batteries, lithium-polymer batteries, primary lithium batteries, alkaline batteries, or any other form of power storage. In some cases, power source 2435 may be a wired power source. Including power source 2435 on neckband 2405 instead of on eyewear device 2402 may help better distribute the weight and heat generated by power source 2435.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 2500 in FIG. 25, that mostly or completely covers a user's field of view. Virtual-reality system 2500 may include a front rigid body 2502 and a band 2504 shaped to fit around a user's head. Virtual-reality system 2500 may also include output audio transducers 2506(A) and 2506(B). Furthermore, while not shown in FIG. 25, front rigid body 2502 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 2400 and/or virtual-reality system 2500 may include one or more liquid crystal displays (LCDs), light emitting diode (LED) displays, micro LED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 2400 and/or virtual-reality system 2500 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 2400 and/or virtual-reality system 2500 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, BLUETOOTH, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 2400 and 2500 of FIGS. 24 and 25, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

As noted, artificial-reality systems 2400 and 2500 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 26:
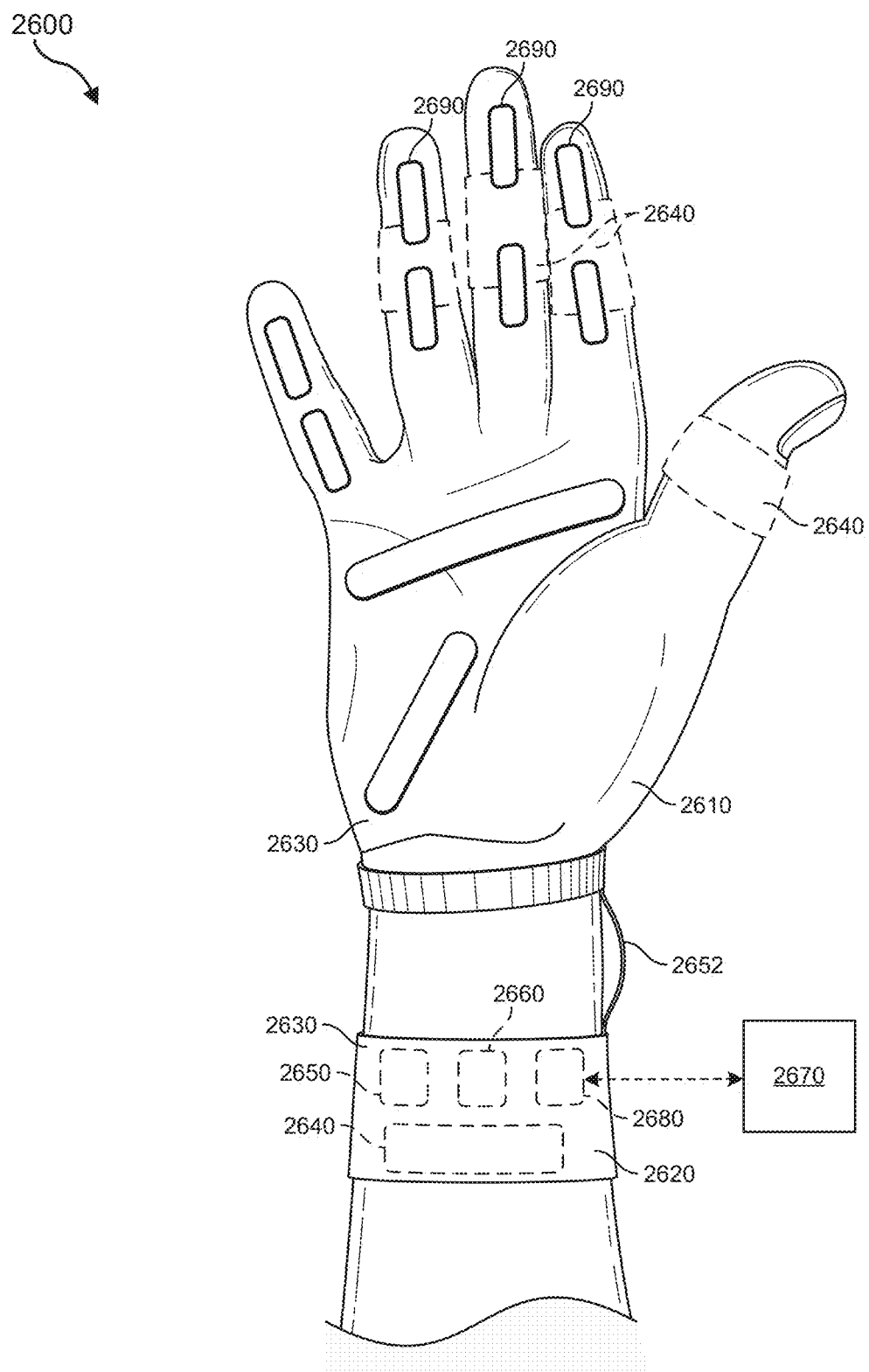
FIG. 26 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 26 illustrates a vibrotactile system 2600 in the form of a wearable glove (haptic device 2610) and wristband (haptic device 2620). Haptic device 2610 and haptic device 2620 are shown as examples of wearable devices that include a flexible, wearable textile material 2630 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities.

In some examples, the term "textile" may include any flexible, wearable material, including woven fabric, non-woven fabric, leather, cloth, a flexible polymer material, composite materials, etc.

One or more vibrotactile devices 2640 may be positioned at least partially within one or more corresponding pockets formed in textile material 2630 of vibrotactile system 2600. Vibrotactile devices 2640 may be positioned in locations to provide a vibrating sensation (e.g., haptic feedback) to a user of vibrotactile system 2600. For example, vibrotactile devices 2640 may be positioned against the user's finger(s), thumb, or wrist, as shown in FIG. 26. Vibrotactile devices 2640 may, in some examples, be sufficiently flexible to conform to or bend with the user's corresponding body part(s).

A power source 2650 (e.g., a battery) for applying a voltage to the vibrotactile devices 2640 for activation thereof may be electrically coupled to vibrotactile devices 2640, such as via conductive wiring 2652. In some examples, each of vibrotactile devices 2640 may be independently electrically coupled to power source 2650 for individual activation. In some embodiments, a processor 2660 may be operatively coupled to power source 2650 and configured (e.g., programmed) to control activation of vibrotactile devices 2640.

Vibrotactile system 2600 may be implemented in a variety of ways. In some examples, vibrotactile system 2600 may be a standalone system with integral subsystems and components for operation independent of other devices and systems. As another example, vibrotactile system 2600 may be configured for interaction with another device or system 2670. For example, vibrotactile system 2600 may, in some examples, include a communications interface 2680 for receiving and/or sending signals to the other device or system 2670. The other device or system 2670 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 2680 may enable communications between vibrotactile system 2600 and the other device or system 2670 via a wireless (e.g., Wi-Fi, BLUETOOTH, cellular, radio, etc.) link or a wired link. If present, communications interface 2680 may be in communication with processor 2660, such as to provide a signal to processor 2660 to activate or deactivate one or more of the vibrotactile devices 2640.

Vibrotactile system 2600 may optionally include other subsystems and components, such as touch-sensitive pads 2690, pressure sensors, motion sensors, position sensors, lighting elements, and/or user interface elements (e.g., an on/off button, a vibration control element, etc.). During use, vibrotactile devices 2640 may be configured to be activated for a variety of different reasons, such as in response to the user's interaction with user interface elements, a signal from the motion or position sensors, a signal from the touch-sensitive pads 2690, a signal from the pressure sensors, a signal from the other device or system 2670, etc.

Although power source 2650, processor 2660, and communications interface 2680 are illustrated in FIG. 26 as being positioned in haptic device 2620, the present disclosure is not so limited. For example, one or more of power source 2650, processor 2660, or communications interface 2680 may be positioned within haptic device 2610 or within another wearable textile.

Figure 27:
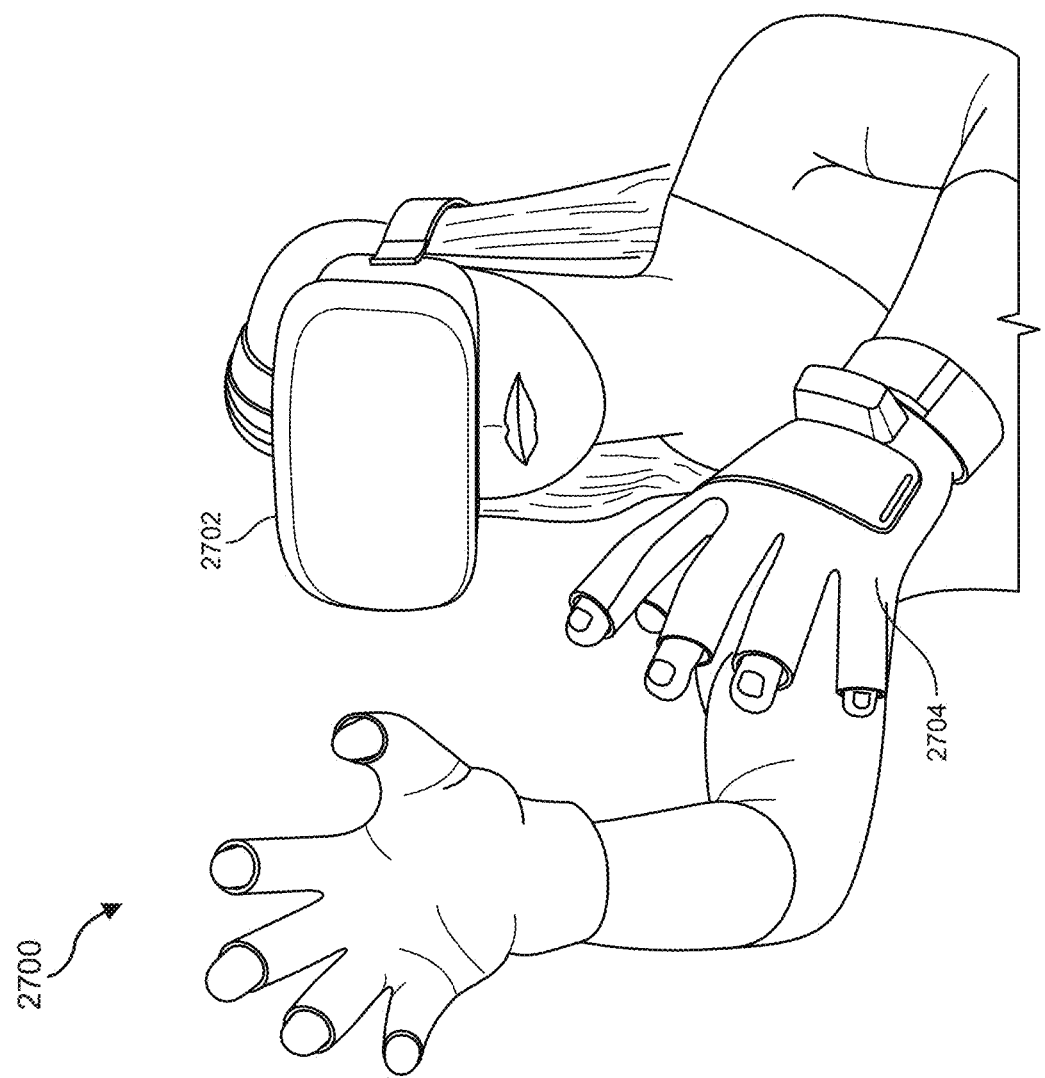
FIG. 27 is an illustration of an exemplary virtual-reality environment according to embodiments of this disclosure.

Haptic wearables, such as those shown in and described in connection with FIG. 26, may be implemented in a variety of types of artificial-reality systems and environments. FIG. 27 shows an example artificial-reality environment 2700 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 25:
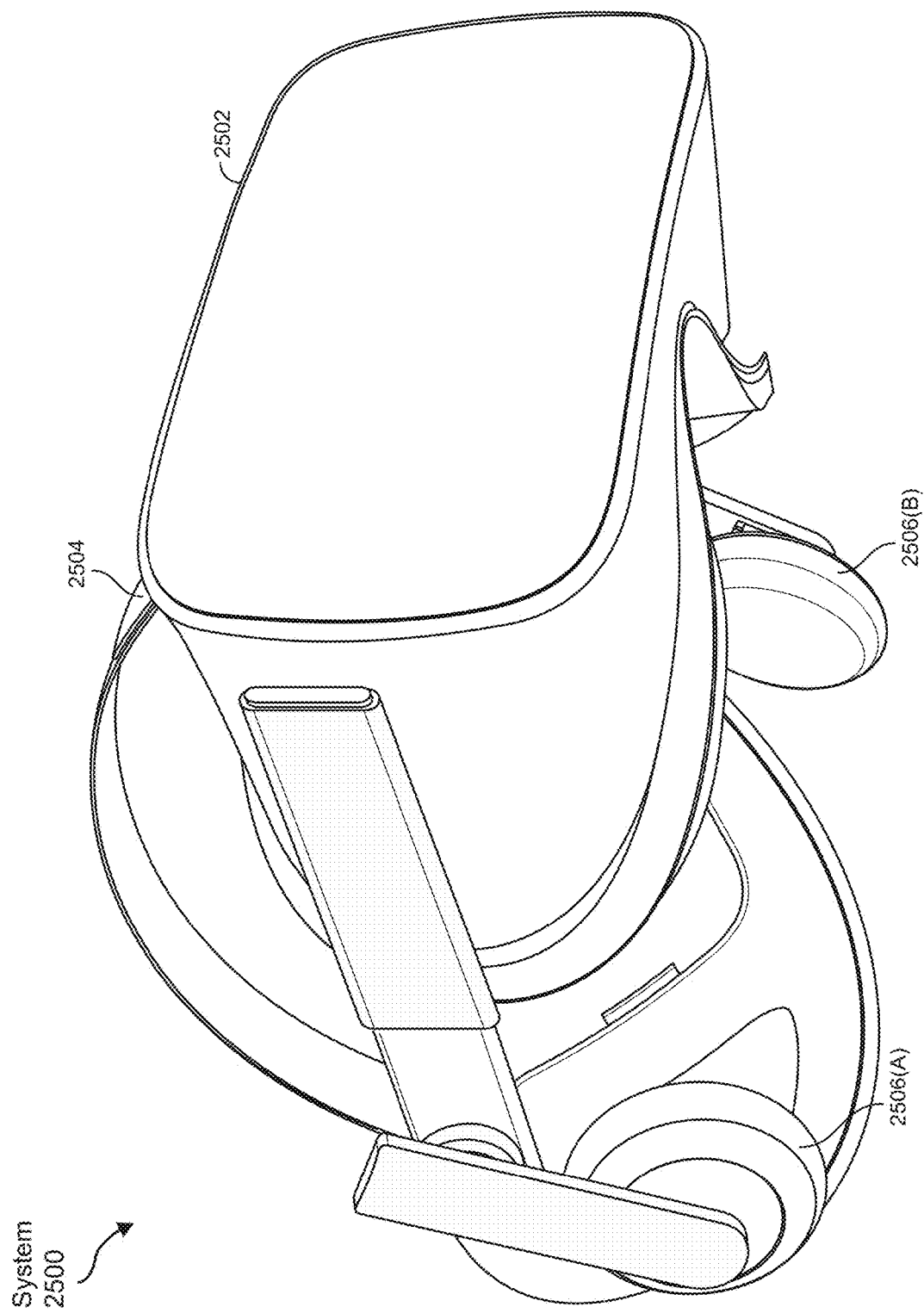
FIG. 25 is an illustration of an exemplary virtual-reality headset that may be used in connection with embodiments of this disclosure.

Head-mounted display 2702 generally represents any type or form of virtual-reality system, such as virtual-reality system 2500 in FIG. 25. Haptic device 2704 generally represents any type or form of wearable device, worn by a user of an artificial-reality system, that provides haptic feedback to the user to give the user the perception that he or she is physically engaging with a virtual object. In some embodiments, haptic device 2704 may provide haptic feedback by applying vibration, motion, and/or force to the user. For example, haptic device 2704 may limit or augment a user's movement. To give a specific example, haptic device 2704 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 2704 to send action requests to a console. Examples of action requests include, without limitation, requests to start an application and/or end the application and/or requests to perform a particular action within the application.

Figure 28:
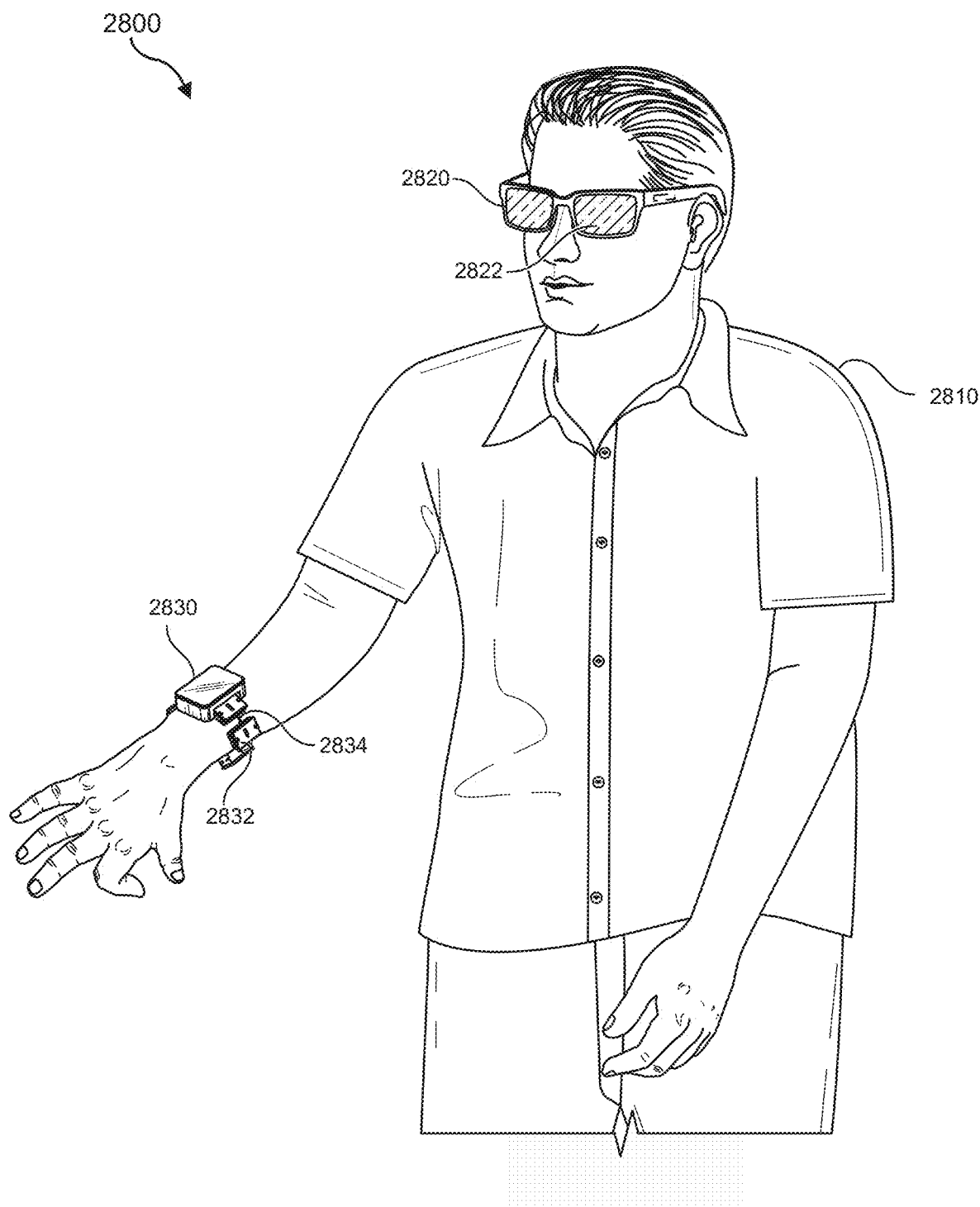
FIG. 28 is an illustration of an exemplary augmented-reality environment according to embodiments of this disclosure.

While haptic interfaces may be used with virtual-reality systems, as shown in FIG. 27, haptic interfaces may also be used with augmented-reality systems, as shown in FIG. 28. FIG. 28 is a perspective view of a user 2810 interacting with an augmented-reality system 2800. In this example, user 2810 may wear a pair of augmented-reality glasses 2820 that may have one or more displays 2822 and that are paired with a haptic device 2830. In this example, haptic device 2830 may be a wristband that includes a plurality of band elements 2832 and a tensioning mechanism 2834 that connects band elements 2832 to one another.

One or more of band elements 2832 may include any type or form of actuator suitable for providing haptic feedback. For example, one or more of band elements 2832 may be configured to provide one or more of various types of cutaneous feedback, including vibration, force, traction, texture, and/or temperature. To provide such feedback, band elements 2832 may include one or more of various types of actuators. In one example, each of band elements 2832 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 2610, 2620, 2704, and 2830 may include any suitable number and/or type of haptic transducer, sensor, and/or feedback mechanism. For example, haptic devices 2610, 2620, 2704, and 2830 may include one or more mechanical transducers, piezoelectric transducers, and/or fluidic transducers. Haptic devices 2610, 2620, 2704, and 2830 may also include various combinations of different types and forms of transducers that work together or independently to enhance a user's artificial-reality experience. In one example, each of band elements 2832 of haptic device 2830 may include a vibrotactor (e.g., a vibrotactile actuator) configured to vibrate in unison or independently to provide one or more of various types of haptic sensations to a user.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 29:
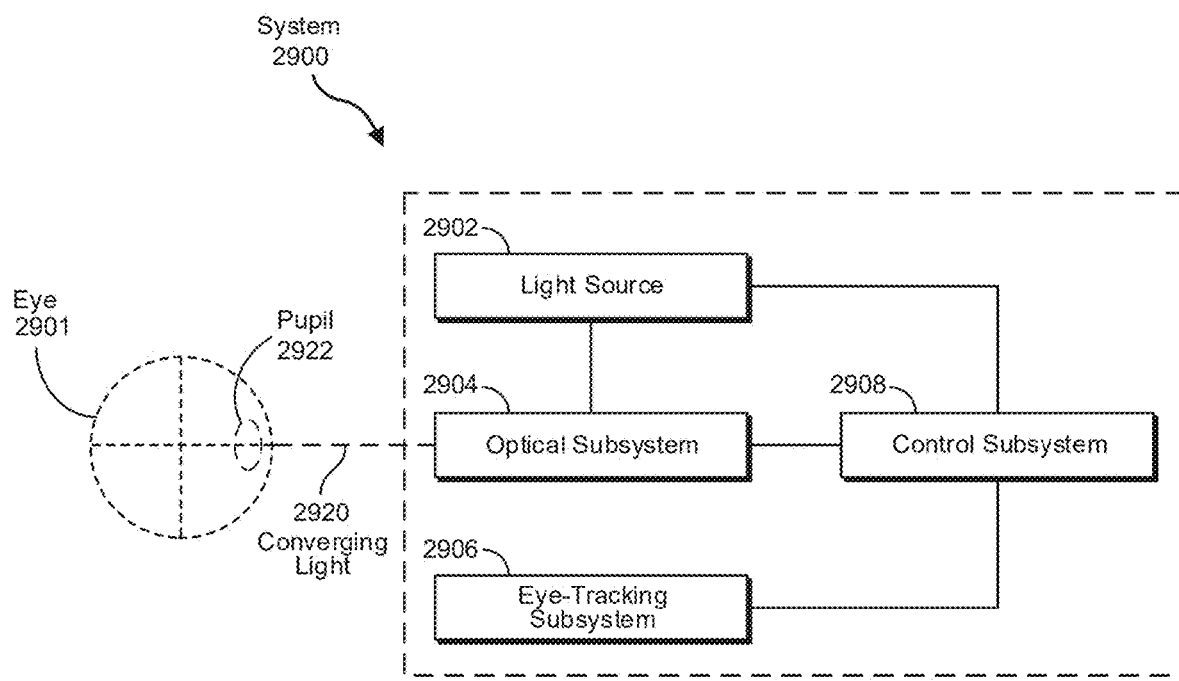
FIG. 29 an illustration of an exemplary system that incorporates an eye-tracking subsystem capable of tracking a user's eye(s).

FIG. 29 is an illustration of an exemplary system 2900 that incorporates an eye-tracking subsystem capable of tracking a user's eye(s). As depicted in FIG. 29, system 2900 may include a light source 2902, an optical subsystem 2904, an eye-tracking subsystem 2906, and/or a control subsystem 2908. In some examples, light source 2902 may generate light for an image (e.g., to be presented to an eye 2901 of the viewer). Light source 2902 may represent any of a variety of suitable devices. For example, light source 2902 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 2904 may receive the light generated by light source 2902 and generate, based on the received light, converging light 2920 that includes the image. In some examples, optical subsystem 2904 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 2920. Further, various mechanical couplings may serve to maintain the relative spacing and/or the orientation of the optical components in any suitable combination.

In one embodiment, eye-tracking subsystem 2906 may generate tracking information indicating a gaze angle of an eye 2901 of the viewer. In this embodiment, control subsystem 2908 may control aspects of optical subsystem 2904 (e.g., the angle of incidence of converging light 2920) based at least in part on this tracking information. Additionally, in some examples, control subsystem 2908 may store and utilize historical tracking information (e.g., a history of the tracking information over a given duration, such as the previous second or fraction thereof) to anticipate the gaze angle of eye 2901 (e.g., an angle between the visual axis and the anatomical axis of eye 2901). In some embodiments, eye-tracking subsystem 2906 may detect radiation emanating from some portion of eye 2901 (e.g., the cornea, the iris, the pupil, or the like) to determine the current gaze angle of eye 2901. In other examples, eye-tracking subsystem 2906 may employ a wavefront sensor to track the current location of the pupil.

Any number of techniques can be used to track eye 2901. Some techniques may involve illuminating eye 2901 with infrared light and measuring reflections with at least one optical sensor that is tuned to be sensitive to the infrared light. Information about how the infrared light is reflected from eye 2901 may be analyzed to determine the position(s), orientation(s), and/or motion(s) of one or more eye feature (s), such as the cornea, pupil, iris, and/or retinal blood vessels.

In some examples, the radiation captured by a sensor of eye-tracking subsystem 2906 may be digitized (i.e., converted to an electronic signal). Further, the sensor may transmit a digital representation of this electronic signal to one or more processors (for example, processors associated with a device including eye-tracking subsystem 2906). Eye-tracking subsystem 2906 may include any of a variety of sensors in a variety of different configurations. For example, eye-tracking subsystem 2906 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 2906 to track the movement of eye 2901. In another example, these processors may track the movements of eye 2901 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 2906 may be programmed to use an output of the sensor(s) to track movement of eye 2901. In some embodiments, eye-tracking subsystem 2906 may analyze the digital representation generated by the sensors to extract eye rotation information from changes in reflections. In one embodiment, eye-tracking subsystem 2906 may use corneal reflections or glints (also known as Purkinje images) and/or the center of the eye's pupil 2922 as features to track over time.

In some embodiments, eye-tracking subsystem 2906 may use the center of the eye's pupil 2922 and infrared or near-infrared, non-collimated light to create corneal reflections. In these embodiments, eye-tracking subsystem 2906 may use the vector between the center of the eye's pupil 2922 and the corneal reflections to compute the gaze direction of eye 2901. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 2906 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 2901 may act as a retroreflector as the light reflects off the retina, thereby creating a bright pupil effect similar to a red-eye effect in photography. If the illumination source is offset from the optical path, then the eye's pupil 2922 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 2908 may control light source 2902 and/or optical subsystem 2904 to reduce optical aberrations (e.g., chromatic aberrations and/or monochromatic aberrations) of the image that may be caused by or influenced by eye 2901. In some examples, as mentioned above, control subsystem 2908 may use the tracking information from eye-tracking subsystem 2906 to perform such control. For example, in controlling light source 2902, control subsystem 2908 may alter the light generated by light source 2902 (e.g., by way of image rendering) to modify (e.g., pre-distort) the image so that the aberration of the image caused by eye 2901 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

Figure 30:
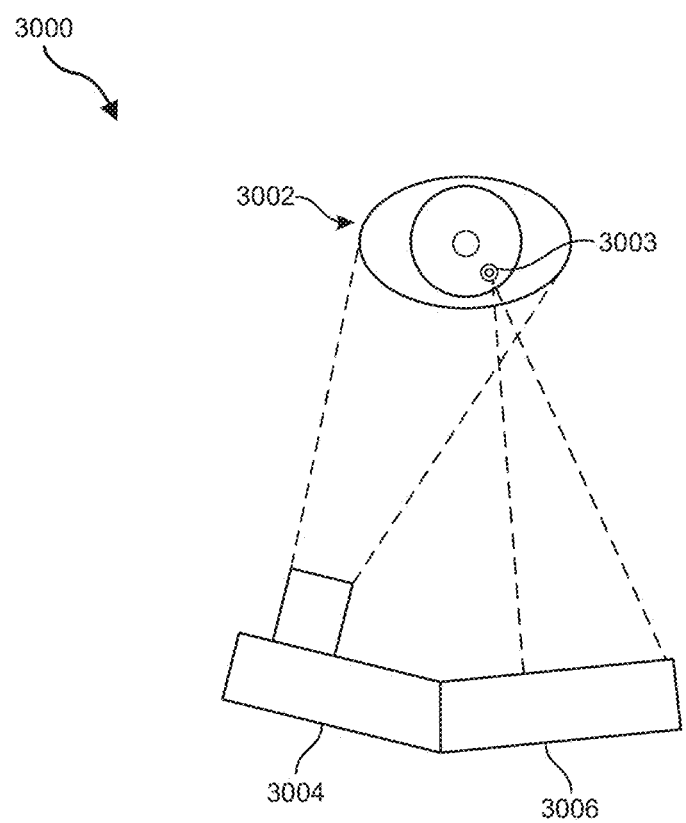
FIG. 30 is a more detailed illustration of various aspects of the eye-tracking subsystem illustrated in FIG. 29.
Figure 30:
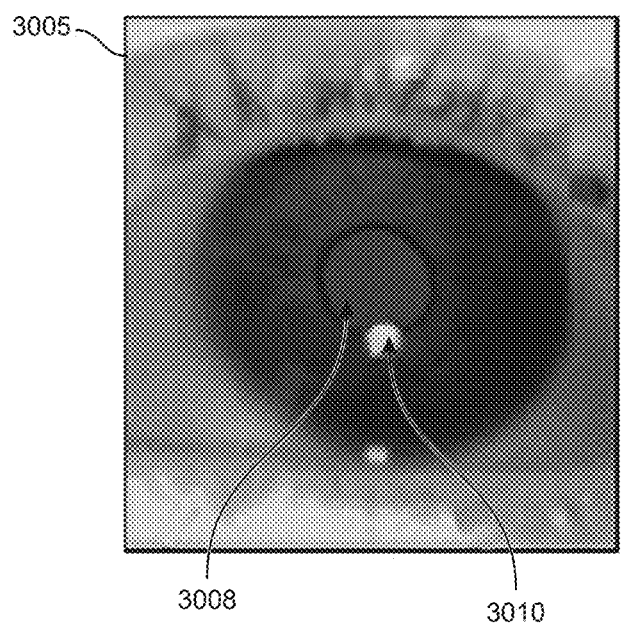

FIG. 30 is a more detailed illustration of various aspects of the eye-tracking subsystem illustrated in FIG. 29. As shown in this figure, an eye-tracking subsystem 3000 may include at least one source 3004 and at least one sensor 3006. Source 3004 generally represents any type or form of element capable of emitting radiation. In one example, source 3004 may generate visible, infrared, and/or near-infrared radiation. In some examples, source 3004 may radiate non-collimated infrared and/or near-infrared portions of the electromagnetic spectrum towards an eye 3002 of a user. Source 3004 may utilize a variety of sampling rates and speeds. For example, the disclosed systems may use sources with higher sampling rates in order to capture fixational eye movements of a user's eye 3002 and/or to correctly measure saccade dynamics of the user's eye 3002. As noted above, any type or form of eye-tracking technique may be used to track the user's eye 3002, including optical-based eye-tracking techniques, ultrasound-based eye-tracking techniques, etc.

Sensor 3006 generally represents any type or form of element capable of detecting radiation, such as radiation reflected off the user's eye 3002. Examples of sensor 3006 include, without limitation, a charge coupled device (CCD), a photodiode array, a complementary metal-oxide-semiconductor (CMOS) based sensor device, and/or the like. In one example, sensor 3006 may represent a sensor having predetermined parameters, including, but not limited to, a dynamic resolution range, linearity, and/or other characteristic selected and/or designed specifically for eye tracking.

As detailed above, eye-tracking subsystem 3000 may generate one or more glints. As detailed above, a glint 3003 may represent reflections of radiation (e.g., infrared radiation from an infrared source, such as source 3004) from the structure of the user's eye. In various embodiments, glint 3003 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 30 shows an example image 3005 captured by an eye-tracking subsystem, such as eye-tracking subsystem 3000. In this example, image 3005 may include both the user's pupil 3008 and a glint 3010 near the same. In some examples, pupil 3008 and/or glint 3010 may be identified using an artificial-intelligence-based algorithm, such as a computer-vision-based algorithm. In one embodiment, image 3005 may represent a single frame in a series of frames that may be analyzed continuously in order to track the eye 3002 of the user. Further, pupil 3008 and/or glint 3010 may be tracked over a period of time to determine a user's gaze.

In one example, eye-tracking subsystem 3000 may be configured to identify and measure the inter-pupillary distance (IPD) of a user. In some embodiments, eye-tracking subsystem 3000 may measure and/or calculate the IPD of the user while the user is wearing the artificial reality system. In these embodiments, eye-tracking subsystem 3000 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 2900 and/or eye-tracking subsystem 3000 may be incorporated into augmented-reality system 2400 in FIG. 24 and/or virtual-reality system 2500 in FIG. 25 to enable these systems to perform various eye-tracking tasks (including one or more of the eye-tracking operations described herein).

Figure 31A:
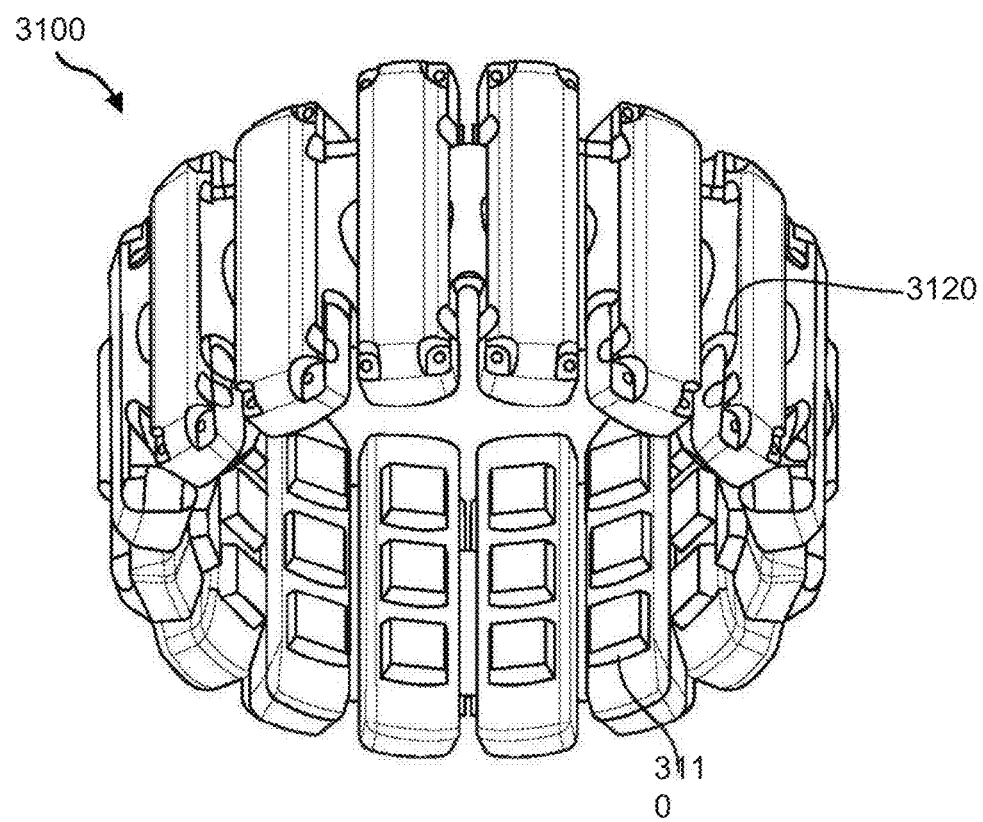
FIGS. 31A and 31B are illustrations of an exemplary human-machine interface configured to be worn around a user's lower arm or wrist.
Figure 31B:
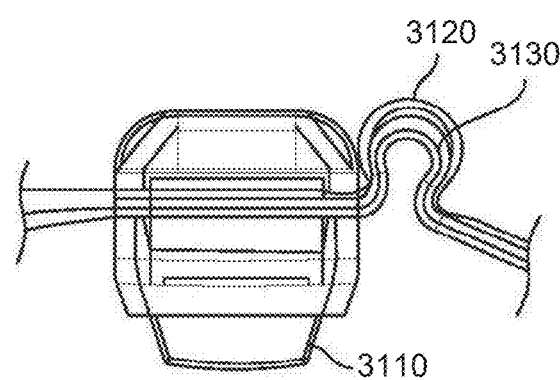

FIG. 31A illustrates an exemplary human-machine interface (also referred to herein as an EMG control interface) configured to be worn around a user's lower arm or wrist as a wearable system 3100. In this example, wearable system 3100 may include sixteen neuromuscular sensors 3110 (e.g., EMG sensors) arranged circumferentially around an elastic band 3120 with an interior surface 3130 configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 31B illustrates a cross-sectional view through one of the sensors of the wearable device shown in FIG. 31A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 3110 is discussed in more detail below with reference to FIGS. 32A and 32B.

FIGS. 32A and 32B illustrate an exemplary schematic diagram with internal components of a wearable system with EMG sensors. As shown, the wearable system may include a wearable portion 3210 (FIG. 32A) and a dongle portion 3220 (FIG. 32B) in communication with the wearable portion 3210 (e.g., via BLUETOOTH or another suitable wireless communication technology). As shown in FIG. 32A, the wearable portion 3210 may include skin contact electrodes 3211, examples of which are described in connection with FIGS. 31A and 31B. The output of the skin contact electrodes 3211 may be provided to analog front end 3230, which may be configured to perform analog processing (e.g., amplification, noise reduction, filtering, etc.) on the recorded signals. The processed analog signals may then be provided to analog-to-digital converter 3232, which may convert the analog signals to digital signals that can be processed by one or more computer processors. An example of a computer processor that may be used in accordance with some embodiments is microcontroller (MCU) 3234, illustrated in FIG. 32A. As shown, MCU 3234 may also include inputs from other sensors (e.g., IMU sensor 3240), and power and battery module 3242. The output of the processing performed by MCU 3234 may be provided to antenna 3250 for transmission to dongle portion 3220 shown in FIG. 32B.

Dongle portion 3220 may include antenna 3252, which may be configured to communicate with antenna 3250 included as part of wearable portion 3210. Communication between antennas 3250 and 3252 may occur using any suitable wireless technology and protocol, non-limiting examples of which include radiofrequency signaling and BLUETOOTH. As shown, the signals received by antenna 3252 of dongle portion 3220 may be provided to a host computer for further processing, display, and/or for effecting control of a particular physical or virtual object or objects.

Although the examples provided with reference to FIGS. 31A-31B and FIGS. 32A-32B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

In some embodiments, one or more objects (e.g., data associated with sensors, and/or activity information) of a computing system may be associated with one or more privacy settings. These objects may be stored on or otherwise associated with any suitable computing system or application, such as, for example, a social-networking system, a client system, a third-party system, a messaging application, a photo-sharing application, a biometric data acquisition application, an artificial-reality application, and/or any other suitable computing system or application.

Privacy settings (or "access settings") for an object may be stored in any suitable manner; such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within an application (such as an artificial-reality application). When privacy settings for an object allow a particular user or other entity to access that object, the object may be described as being "visible" with respect to that user or other entity. As an example, a user of an artificial-reality application may specify privacy settings for a user-profile page that identify a set of users that may access the artificial-reality application information on the user-profile page, thus excluding other users from accessing that information. As another example, an artificial-reality application may store privacy policies/guidelines. The privacy policies/guidelines may specify what information of users may be accessible by which entities and/or by which processes (e.g., internal research, advertising algorithms, machine-learning algorithms), thus ensuring only certain information of the user may be accessed by certain entities or processes.

In some embodiments, privacy settings for an object may specify a "blocked list" of users or other entities that should not be allowed to access certain information associated with the object. In some cases, the blocked list may include third-party entities. The blocked list may specify one or more users or entities for which an object is not visible.

Privacy settings associated with an object may specify any suitable granularity of permitted access or denial of access. As an example, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. In some embodiments, different objects of the same type associated with a user may have different privacy settings. In addition, one or more default privacy settings may be set for each object of a particular object-type.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a set of object augments to be transformed, transform the set of object augments into a smaller set of object augments, output a result of the transformation to a user via an augmented-reality system, use the result of the transformation to provide information and/or access to an action associated with an object to the user, and store the result of the transformation to a physical-memory accessible to the augmented-reality system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
maintaining, by an extended-reality system, access to a database containing a plurality of object augments, each of the plurality of object augments being mapped to one or more objects along with which the object augment is configured to be presented to and sensed by a user via the extended-reality system;
detecting, by the extended-reality system, an object in the user's environment, the object being mapped to at least one object augment in the database;
determining, by the extended-reality system, a current contextual condition of the user;
identifying, by the extended-reality system based on comparing the current contextual condition to a previously observed similar contextual condition, a presentation condition associated with the at least one object augment;
identifying, by the extended-reality system, a preference of the user for the at least one object augment;
determining, by the extended-reality system, whether a combination of the presentation condition associated with the at least one object augment and the preference of the user for the at least one object augment is satisfied;
when the combination of the presentation condition and the preference of the user is satisfied, prioritizing presentation of the at least one object augment to the user via the extended-reality system; and
when the presentation condition is not satisfied, constraining presentation of the at least one object augment to the user via the extended-reality system.

2. The computer-implemented method of claim 1, wherein:
the at least one object augment comprises one or more of:
information associated with the object;
an action associated with the object; or
an interface through which the user initiates the action.

3. The computer-implemented method of claim 2, wherein identifying the preference of the user for the at least one object augment comprises receiving, by the extended-reality system, input from the user indicating the preference of the user for the at least one object augment.

4. The computer-implemented method of claim 2, wherein
identifying the preference of the user for the at least one object augment comprises:
monitoring, by the extended-reality system, one or more interactions of the user with one or more of the plurality of object augments and one or more contextual conditions of the one or more interactions; and inferring, by the extended-reality system, the preference of the user for the at least one object augment from at least the one or more interactions of the user when the one or more contextual conditions are present.

5. The computer-implemented method of claim 2, wherein:
the at least one object augment comprises a collection of related object augments that have at least one attribute in common; and
the preference of the user for the at least one object augment comprises a preference for object augments having the at least one attribute.

6. The computer-implemented method of claim 1, wherein:
the presentation condition is based at least in part on the user being in a predetermined state; and
determining whether the presentation condition is satisfied comprises determining whether the user is presently in the predetermined state.

7. The computer-implemented method of claim 6, wherein the predetermined state was defined at least in part by the user or another entity associated with the at least one object augment.

8. The computer-implemented method of claim 6, further comprising:
monitoring, by the extended-reality system, a plurality of states of the user;
while monitoring the plurality of states of the user, identifying the preference of the user, while the user is in the predetermined state, for the at least one object augment and/or at least one additional object augment that shares a common attribute with the at least one object augment; and
basing, by the extended-reality system, the presentation condition on the predetermined state.

9. The computer-implemented method of claim 1, wherein:
the at least one object augment is associated with a graded attribute; and
the presentation condition is based at least in part on the graded attribute satisfying a predetermined threshold.

10. The computer-implemented method of claim 1, wherein:
the at least one object augment is associated with one or more identifiers of the object; and
the one or more identifiers are used to detect the object in the user's environment.

11. The computer-implemented method of claim 1, further comprising ignoring the presentation condition to prioritize presentation of the at least one object augment when the current contextual condition exceeds a safety threshold.

12. An extended-reality system comprising:
at least one physical processor;
physical memory comprising computer-executable instructions that, when executed by the physical processor, cause the physical processor to:
maintain access to a database containing a plurality of object augments, each of the plurality of object augments being mapped to one or more objects along with which the object augment is configured to be presented to and sensed by a user via the extended-reality system;
detect an object in the user's environment, the object being mapped to at least one object augment in the database;
determine a current contextual condition of the user;
identify, based on comparing the current contextual condition to a previously observed similar contextual condition, a presentation condition associated with the at least one object augment;
identify, a preference of the user for the at least one object augment;
determine whether a combination of the presentation condition and the preference of the user associated with the at least one object augment is satisfied;
when the combination of the presentation condition and the preference of the user is satisfied, prioritize presentation of the at least one object augment to the user via the extended-reality system; and
when the presentation condition is not satisfied, constrain presentation of the at least one object augment to the user via the extended-reality system.

13. The extended-reality system of claim 12, wherein identifying the preference of the user for the at least one object augment comprises:
monitoring, by the extended-reality system, one or more interactions of the user with one or more of the plurality of object augments and one or more contextual conditions of the one or more interactions; and
inferring, by the extended-reality system, the preference of the user for the at least one object augment from at least the one or more interactions of the user when the one or more contextual conditions are present.

14. The extended-reality system of claim 12, wherein:
the presentation condition is based at least in part on the user being in a predetermined state; and
determining whether the presentation condition is satisfied comprises determining whether the user is presently in the predetermined state.

15. The extended-reality system of claim 12, wherein the physical memory comprises additional computer-executable instructions that, when executed by the physical processor, cause the physical processor to ignore the presentation condition to prioritize presentation of the at least one object augment when the current contextual condition exceeds a safety threshold.

16. A non-transitory computer-readable medium comprising one or more computer-executable instructions that, when executed by at least one processor of an extended-reality system, cause the extended-reality system to:
maintain access to a database containing a plurality of object augments, each of the plurality of object augments being mapped to one or more objects along with which the object augment is configured to be presented to and sensed by a user via the extended-reality system;
detect an object in the user's environment, the object being mapped to at least one object augment in the database;
determine a current contextual conditions of the user;
identify, based on comparing the current contextual condition to a previously observed similar contextual condition, a presentation condition associated with the at least one object augment;
identify a preference of the user for the at least one object augment;
determine whether a combination of the presentation condition associated with the at least one object augment and the preference of the user for the at least one object augment is satisfied;
when the combination of the presentation condition and the preference of the user is satisfied, prioritize presentation of the at least one object augment to the user via the extended-reality system; and when the presentation condition is not satisfied, constrain presentation of the at least one object augment to the user via the extended-reality system.

17. The non-transitory computer-readable medium of claim 16, wherein the instructions when executed by the at least one processor of the extended-reality system, further cause the extended-reality system to ignore the presentation condition to prioritize presentation of the at least one object augment when the current contextual condition exceeds a safety threshold.

18. The non-transitory computer-readable medium of claim 16, wherein:
the at least one object augment comprises one or more of:
information associated with the object;
an action associated with the object; or
an interface through which the user initiates the action.

19. The non-transitory computer-readable medium of claim 18, wherein identifying the preference of the user for the at least one object augment comprises receiving, by the extended-reality system, input from the user indicating the preference of the user for the at least one object augment.

20. The non-transitory computer-readable medium of claim 18, wherein identifying the preference of the user for the at least one object augment comprises:
monitoring, by the extended-reality system, one or more interactions of the user with one or more of the plurality of object augments and one or more contextual conditions of the one or more interactions; and
inferring, by the extended-reality system, the preference of the user for the at least one object augment from at least the one or more interactions of the user when the one or more contextual conditions are present.

\* \* \* \* \*